United States Patent
Dianda et al.

(10) Patent No.: US 7,848,731 B1
(45) Date of Patent: Dec. 7, 2010

(54) SYSTEM AND METHOD FOR COMMUNICATING A COMBINED DIGITAL SIGNAL FOR WIRELESS SERVICE VIA INTEGRATED HYBRID FIBER COAX AND POWER LINE COMMUNICATION DEVICES FOR A DISTRIBUTED ANTENNA SYSTEM OVER SHARED BROADBAND MEDIA

(75) Inventors: Janet Ruth Dianda, Ashburn, VA (US); Sunil Prasad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 611 days.

(21) Appl. No.: 11/838,744

(22) Filed: Aug. 14, 2007

(51) Int. Cl.
*H04M 11/00* (2006.01)

(52) U.S. Cl. ............... 455/402; 455/403; 725/105; 725/126; 370/480; 370/485; 370/486; 370/487; 370/466

(58) Field of Classification Search .............. None
See application file for complete search history.

(56) References Cited

U.S. PATENT DOCUMENTS

| | | | |
|---|---|---|---|
| 5,682,256 | A | 10/1997 | Motley et al. |
| 5,809,422 | A | 9/1998 | Raleigh et al. |
| 5,949,564 | A | 9/1999 | Wake |
| 6,154,443 | A | 11/2000 | Huang et al. |
| 6,525,855 | B1 | 2/2003 | Westbrook et al. |
| 6,781,981 | B1 | 8/2004 | Kimbrough |
| 6,782,048 | B2 | 8/2004 | Santhoff |
| 6,788,666 | B1 * | 9/2004 | Linebarger et al. .......... 370/338 |
| 6,826,163 | B2 | 11/2004 | Mani et al. |
| 6,826,164 | B2 | 11/2004 | Mani et al. |
| 6,831,901 | B2 | 12/2004 | Millar |
| 6,963,552 | B2 | 11/2005 | Sabat et al. |
| 7,099,308 | B2 * | 8/2006 | Merrill et al. ............... 370/352 |
| 7,236,509 | B2 | 6/2007 | Gerrits et al. |
| 7,349,478 | B2 | 3/2008 | Lakkis |
| 7,359,426 | B2 | 4/2008 | Ojard |
| 7,634,250 | B1 * | 12/2009 | Prasad et al. ................ 455/403 |
| 2001/0036163 | A1 | 11/2001 | Sabat et al. |
| 2002/0186436 | A1 | 12/2002 | Mani et al. |
| 2002/0191565 | A1 | 12/2002 | Mani et al. |
| 2003/0016418 | A1 | 1/2003 | Westbrook et al. |
| 2003/0157943 | A1 | 8/2003 | Sabat, Jr. |

(Continued)

OTHER PUBLICATIONS

U.S. Appl. No. 11/689,808, filed Mar. 22, 2007.

(Continued)

*Primary Examiner*—Ajit Patel

(57) ABSTRACT

A signal conditioner (SC) and method for communicating via a shared transport medium (STM) between a BTS and remote antenna entity (RAE). A first SC connects to the BTS and a second SC connects to the RAE. Each SC connects to a cable modem or BPL modem that interfaces to the STM. The first SC receives an RF signal carrying an analog baseband signal (ABS) representing digital signals for multiple communication channels. The first SC generates a CDS based on power level measurements of the ABS, and then transmits the CDS to the second SC via the STM. The second SC recovers the CDS, converts the CDS to another ABS, generates an RF signal carrying the other ABS, and transmits this RF signal to the RAE for transmission away from the RAE. The first SC and second SC also facilitate communication of a CDS from the RAE to BTS.

27 Claims, 9 Drawing Sheets

U.S. PATENT DOCUMENTS

| | | | |
|---|---|---|---|
| 2004/0057393 | A1 | 3/2004 | Bianchi et al. |
| 2004/0198453 | A1* | 10/2004 | Cutrer et al. ............. 455/562.1 |
| 2004/0219897 | A1 | 11/2004 | Choi |
| 2005/0003769 | A1 | 1/2005 | Foerster et al. |
| 2005/0078699 | A1* | 4/2005 | Cummings .................. 370/437 |
| 2005/0147067 | A1 | 7/2005 | Mani et al. |
| 2005/0172198 | A1 | 8/2005 | Millar |
| 2005/0226625 | A1 | 10/2005 | Wake et al. |
| 2005/0243785 | A1* | 11/2005 | Sabat et al. .................. 370/338 |
| 2005/0270221 | A1 | 12/2005 | Fedotov et al. |
| 2005/0282536 | A1 | 12/2005 | McClure et al. |
| 2006/0165155 | A1 | 7/2006 | Liu et al. |
| 2009/0046593 | A1* | 2/2009 | Ptasinski et al. ............ 370/252 |

OTHER PUBLICATIONS

U.S. Appl. No. 11/405,917, filed Apr. 18, 2006.

U.S. Appl. No. 11/378,998, filed Mar. 17, 2006.

Richard H. Blackwell, "Digital Sampling Power Analyzer for GSM and CDMA," Boonton Electronics, Mar. 31, 2004.

CDMA Technology, Multiple Access, downloaded from the World Wide Web at http://www.tsp.ece.mcgill.ca/Telecom/Docs/cdma.html on Jul. 5, 2007.

CDMA Overview—Access Schemes, downloaded from the World Wide Web at http://www.umtsworld.com/technology/cdmabasics.htm on Jul. 5, 2007.

Code Division Multiple Access, downloaded from http://en.wikipedia.org/wiki/CDMA on Jul. 5, 2007.

Binary Numbers—Adding and Subtracting Binary Numbers, downloaded from http://www.helpwithpcs.com/courses/adding-subtracting-binary-numbers.htm on Jul. 5, 2007.

David Barras, et.al, A Comparison Between ultra-Wideband and Narrowband Transceivers, Laboratory for Electionics, Swiss Federal Institute of Technology (ETH), Zurich, Switzerland, Oct. 26, 2004.

"FCC Approves First Commercial UWB Chipset", downloaded from the World Wide Web at http://www.wi-fiplanet.com.news/print.php/3392771 on Nov. 29, 2006.

David Yaish, Why MB-OFDM is the Best Solution for the Industry, UWB Insider, Apr. 29, 2004.

Ultra-wideband, downloaded from http://en.wikipedia.org/wiki/Ultra_wideband on Dec. 13, 2006.

Mike Harwood, Understanding Networking Components and Devices for the Network+Exam, downloaded from the World Wide Web at http://www.examcram2.com/articles/article.asp?p=398091&seqNum=13&rl=1 on Dec. 28, 2006.

Want WiMax?, Aug. 31, 2006, downloaded from the World Wide Web at http://www.navini.com/Website/assets/pdfs/Brochures/Navini_Overview_04.pdf.

PCMAG, Encyclopedia, Definition of Baseband, Computer Desktop Encyclopedia, downloaded from the World Wide Web at http://www.pcmag.com/encyclopedia_term/0,2452,t=baseband&i=38438,00.asp on Jan. 4, 2007.

Domestic AC Power Plugs and Sockets, downloaded from the World Wide Web on at http://en.wikipedia.org/wiki/Domestic_AC_power_plugs_and_sockets on Aug. 4, 2006.

Federal Communications Commission, "What is a Broadband", downloaded from the World Wide Web at http://www.fcc.gov/cgb/broadband.html on Dec. 28, 2006.

James Stenger, "Broadband power Line Tutorial", Wave Report, downloaded from the World Wide Web at http://www.wave-report.com/tutorials/bpl.htm on Jun. 2, 2006.

Robert Valdes, "How Broadband Over Powerlines Works", How Stuff Works, downloaded from the World Wide Web at http://computer.howstuffworks.com/bpl.htm/printable on Jun. 2, 2006.

Commissioners Michael J. Copps and Kevin J. Martin, First Report and Order, in the Matter of Revision of part 15 of the Commission's Rules Regarding Ultra-Wideband Transmission Systems, ET Docket 98-153, Apr. 22, 2002.

U.S. Appl. No. 11/838,756, filed Aug. 14, 2007.

* cited by examiner

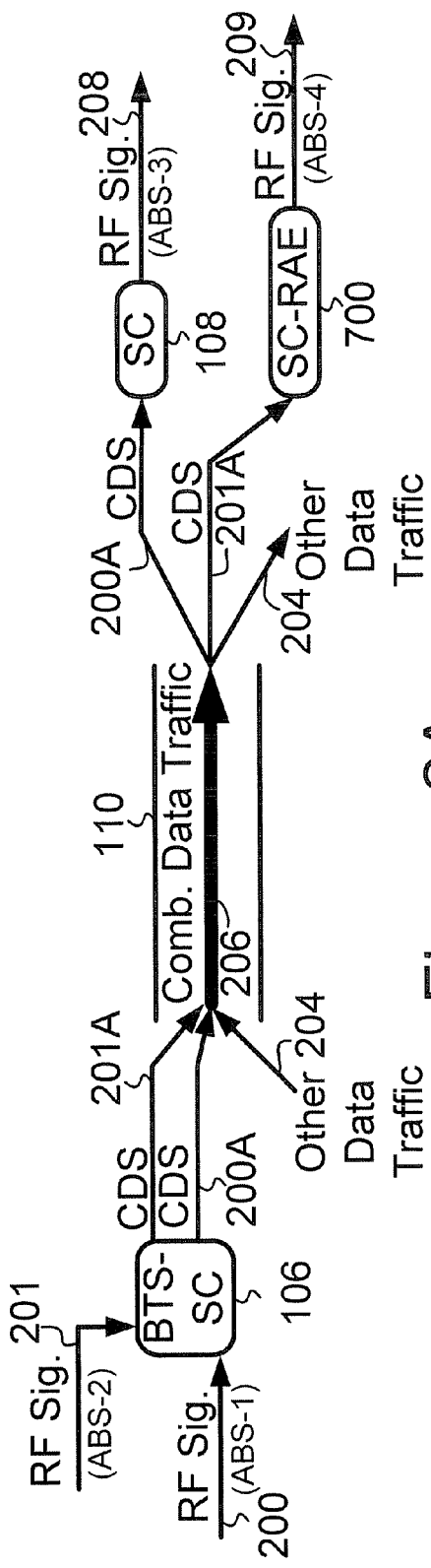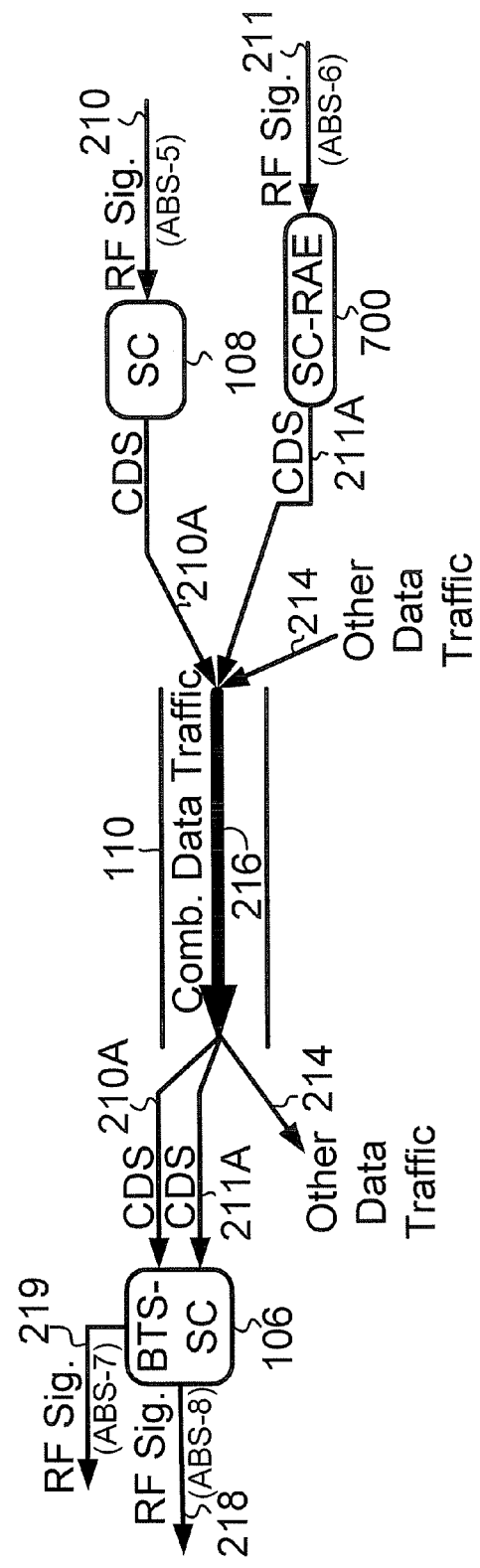
Figure 2A
Figure 2B

SYSTEM AND METHOD FOR COMMUNICATING A COMBINED DIGITAL SIGNAL FOR WIRELESS SERVICE VIA INTEGRATED HYBRID FIBER COAX AND POWER LINE COMMUNICATION DEVICES FOR A DISTRIBUTED ANTENNA SYSTEM OVER SHARED BROADBAND MEDIA

FIELD OF INVENTION

The present invention relates to communication of digital signals, and more particularly to communication of a combined digital signal for wireless service over a shared transport medium.

DESCRIPTION OF RELATED ART

Wireless carriers provide wireless communication service to wireless communication customers. In order to improve the wireless communication service provided to such customers, some wireless carriers have begun implementing or are considering implementing a distributed antenna system (DAS) to extend the range of their existing wireless network infrastructure.

A current wireless network infrastructure may include multiple base transceiver stations (BTSs) that radiate radio frequency (RF) signals from an antenna so as to form a cell and/or cell sector. A wireless carrier may extend the range of its wireless network infrastructure by connecting a DAS to one or more of the BTSs. Each DAS may include one or more remote antenna entities (RAEs), a dedicated transport medium that connects a BTS to the one or more remote antenna entities ties of the DAS, and one or more antennas connected to each remote entity. A BTS can provide RF signals to one or more remote antenna entities (i.e., located remote from the BTS) and, in turn, the one or more antennas connected to the remote antenna entities may radiate the received RF signals so as to extend a cell and/or cell sector coverage to the vicinity of each remote entity, such as at a location remote from the BTS.

In current implementations, a dedicated transport medium, such as a fiber optic cable, is used to provide a communication path between a BTS and the remote antenna entities of the DAS. The dedicated transport medium is a mechanism in which all data transported through the transport medium passes through the BTS and the DAS. A dedicated transport medium is necessary because the signals currently transmitted between the BTS and the DAS take up most, if not all, of the capacity of the transport medium.

As an example, a BTS and a DAS may carry out communications between themselves and, in turn, with wireless communication devices, using a dedicated transport mechanism to carry wireless service signaling in accordance with the Code Division Multiple Access (CDMA) protocol. The CDMA protocol uses a spread spectrum signal in which the users' information signals to be communicated (the traffic channels) plus control information (the control channels) are spread over a much wider band channel than what would be required to communicate the information signal before the information signal is spread over that channel. This enables the signal to be resilient to interference, allowing more users to share the same spectrum, thereby increasing spectral efficiency.

In a typical BTS, the information signals and the control information modulate an RF carrier, forming an analog RF signal which is then sent through an antenna feed from the BTS to an antenna for propagation (e.g., transmission) over the air. If instead it is desired to send the information signals and control information through a dedicated transport medium to a remote entity of a DAS, then the analog RF signal is sent through the antenna feed of the BTS to another entity which then sends the analog RF signal over the dedicated transport medium. Alternatively, an entity may sample the analog RF signal sent through the antenna feed, at a rate at least twice that of the bandwidth, according to the Nyquist theorem, to create a digitized representation of the analog RF signal, then send the digitized RF signal to a remote entity of the DAS over the dedicated transport medium. In either case, the resulting bandwidth required to send the signal from the BTS to the remote entity is much greater than the information signals and control information generated inside of the BTS.

A dedicated transport medium is therefore necessary between the BTS and the remote entity of the DAS so as to allow for communication of the high-bandwidth analog RF signal or the digitized representation of the analog RF signal.

Communicating signals between a BTS and a remote entity of a DAS using such high bandwidth of a dedicated transport medium, however, is undesirable, as it can be quite costly to provide and maintain such a dedicated transport medium. An improvement is therefore desired.

SUMMARY

The present invention is directed to a system and method for communicating a combined digital signal (CDS), for wireless service, over a shared transport medium, which provides a solution requiring much less bandwidth than solutions that require high bandwidth. The CDS may represent the original digital signals carried by an analog RF signal such that, much less bandwidth may be used to carry the CDS to the DAS from the BTS (or to the BTS from the DAS) than sending either the analog RF signal or a digitized representation of the analog RF signal. The use of much less bandwidth may therefore facilitate use of a shared transport medium, rather than a dedicated transport medium.

For forward-link communications from a base transceiver station (BTS) to a remote antenna entity (RAE) (or multiple remote antenna entities) of a DAS, a CDS may represent the total information (e.g., traffic and control digital signals) to be transmitted to one or more wireless communication devices via multiple forward-link communication channels during a given period of time. For reverse-link communications (e.g., communications in a direction from an RAE to the BTS), a CDS may represent the total information transmitted to the RAE from the one or more wireless communication devices via multiple reverse-link communication channels during a given period of time.

The BTS may assign the forward-link and reverse-link communication channels to the one or more wireless communication devices. The forward-link and reverse-link communication channels may carry digital signals according to any of a variety of air interface protocols, such as a CDMA air interface protocol, a Time Division Multiple Access (TDMA) air interface protocol, or an Orthogonal Frequency Division Multiple Access (OFDMA) air interface protocol.

The CDS represents digital signals from multiple communication channels. These communication channels may comprise multiple user traffic channels (e.g., voice channels and/or data channels) and control channels used for communication between the BTS and the users' wireless devices. The data channels may communicate data that includes packetized voice data.

The CDS may be (i) generated at a signal conditioner within or remote from a base transceiver station, (ii) transmitted to a remote signal conditioner via a shared transport medium, (iii) recovered at the remote signal conditioner, and (iv) converted to an analog baseband signal. The remote signal conditioner or a remote antenna entity of a DAS may modulate an RF carrier with the analog baseband signal to generate an RF signal carrying the analog baseband signal. Thereafter, the remote antenna entity transmits the RF signal over an air interface to one or more wireless communication devices. This transmitted RF signal may be identical or substantially identical to an RF signal transmitted from the BTS for carrying out forward link communications with one or more other wireless communication devices.

The RAE of the DAS may receive a second RF signal representing digital signals transmitted from one or more wireless communication devices over multiple reverse-link communication channels. The RAE may provide the second RF signal to the remote signal conditioner. The remote signal conditioner may generate a second CDS and provide the second CDS to the transport medium for transmission, in turn, to the signal conditioner connected to the BTS. The signal conditioner connected to the BTS may receive the second CDS, convert the CDS to an analog baseband signal, and transmit the analog baseband signal to the BTS via the antenna feed connecting the signal conditioner and the BTS. The BTS may convert the analog baseband signal to a digital signal representing the signals transmitted from one or more wireless communication devices, and then communicate the digital signal or a portion of the digital signal to one or more other devices, such as a telephone or computer connected to a public switched telephone network and/or an internet protocol (IP) network.

In one respect, an exemplary embodiment of the present invention may take the form of a system comprising: an antenna, a cable modem connectable to a coaxial cable of a Hybrid Fiber Coaxial (HFC) network, a remote antenna entity connected to the antenna, and a signal conditioner connected to the remote antenna entity and to the cable modem. The remote antenna entity and the signal conditioner may be located within a housing. The remote antenna entity receives from the antenna an RF signal carrying an analog baseband signal representing digital signals having a destination of a BTS. The digital signals are transmitted to the antenna via multiple reverse-link communication channels from one or more wireless communication devices. The signal conditioner (i) receives the RF signal from the remote antenna entity, (ii) demodulates the RF signal to recover the analog baseband signal, (iii) makes power level measurements of the recovered analog baseband signal, (iv) generates a CDS comprising data bits representing one of the power level measurements, (v) generates a set of broadband packets with payload carrying the CDS, and (vi) provides the set of broadband packets to the cable modem for transmission over the HFC network and, in turn, to another signal conditioner that interfaces to the BTS.

In another respect, an exemplary embodiment of the present invention may take the form of a method that includes receiving at an RAE an RF signal carrying an analog baseband signal that represents digital signals having a destination of a BTS. The RF signal comprises multiple RF signals transmitted to an antenna of the RAE via multiple reverse-link communication channels from one or more wireless communication devices. Additionally, the method includes at a signal conditioner connected to the remote antenna entity and to a cable modem connectable to an HFC network, (i) receiving the RF signal from the remote antenna entity, (ii) demodulating the RF signal to recover the analog baseband signal, (iii) making power level measurements of the recovered analog baseband signal, (iv) generating a CDS comprising data bits representing one of the power level measurements of the recovered analog baseband signal, (v) producing a set of broadband packets with payload carrying the CDS, and (vi) providing the set of broadband packets with payload carrying the CDS to the cable modem for transmission of the set of broadband packets via the HFC network and, in turn, to the BTS.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which:

FIG. 2A depicts an exemplary arrangement for transporting data through a shared transport medium from a first signal conditioner to a second signal conditioner;

FIG. 2B depicts an exemplary arrangement for transporting data through the shared transport medium from the second signal conditioner to the first signal conditioner;

Reference numerals are shown in the drawings to identify various elements of the drawings. Drawing elements having identical reference numerals are substantially identical or identical elements.

DETAILED DESCRIPTION

1. Overview

The present invention provides for signal conditioners, systems and methods for performing bidirectional communications (e.g., forward-link communications and reverse-link communications) between a base transceiver station (BTS) and a Distributed Antenna System (DAS). The BTS and the DAS may perform wireless communications with one or more wireless communication devices. The communications between the BTS and the DAS may be carried out, at least in part, by transmission of a CDS via a shared transport medium between (i) a signal conditioner connected to the BTS (hereinafter a "BTS-SC"), and (ii) a signal conditioner connected to a remote antenna entity of the DAS.

2. Exemplary Architecture

Figure 1:
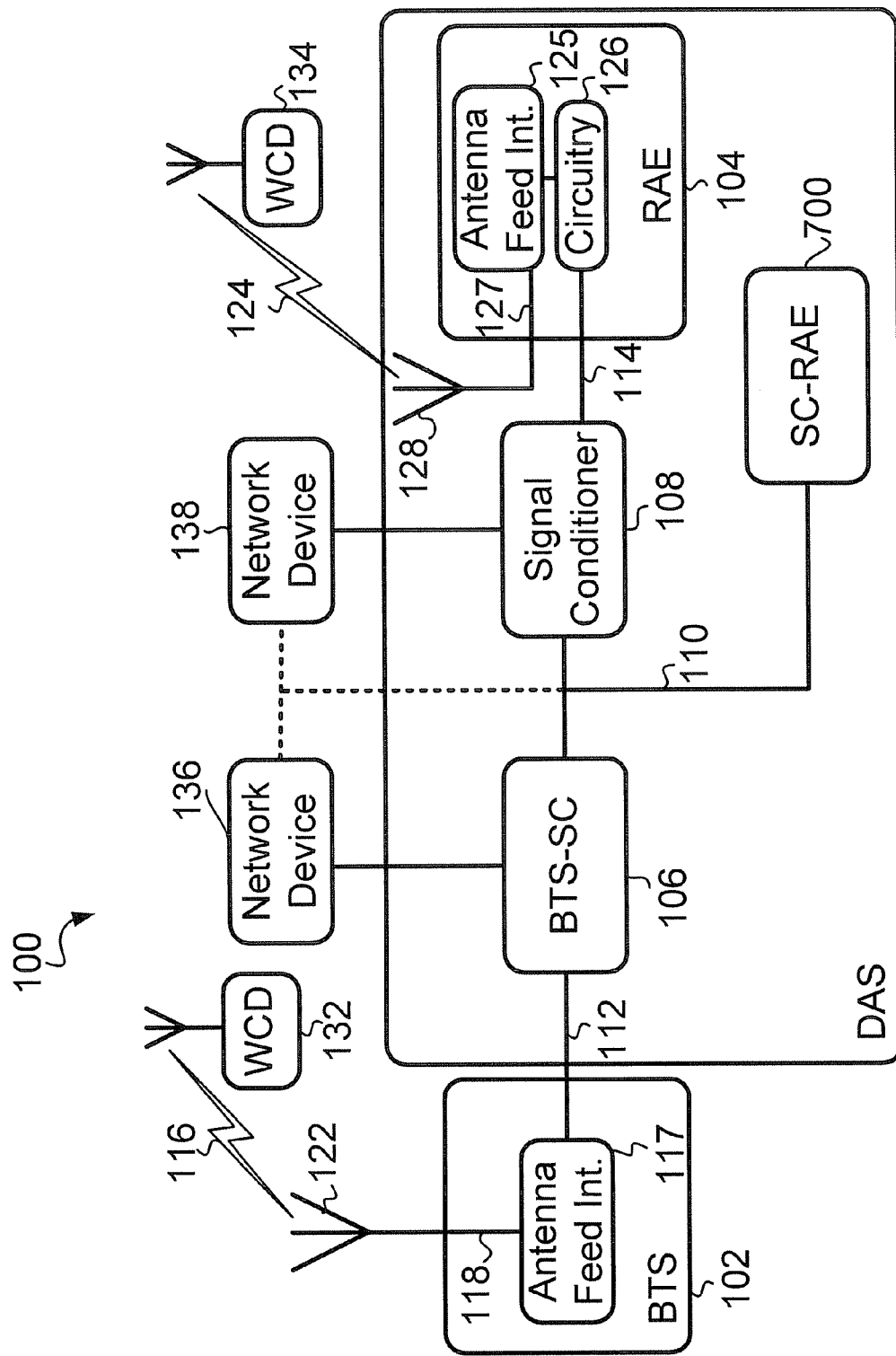
FIG. 1 is a block diagram of an exemplary system for carrying out the invention.

FIG. 1 is a block diagram of an exemplary system 100 for carrying out the invention. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

System 100 includes a BTS 102 and a DAS 103. DAS 103 includes a remote antenna entity (RAE) 104, a signaling conditioning remote antenna entity (SC-RAE) 700, a BTS-SC 106, a signal conditioner 108, and a shared transport medium 110. System 100 also includes: (i) an antenna feed 112 providing a communication path between BTS 102 and BTS-SC 106, (ii) a communication connection 114 connecting RAE 104 to signal conditioner 108, (iii) wireless communication devices 132, 134, and (iv) network devices 136, 138 remote from BTS-SC 106 and signal conditioner 108. The dashed line of transport medium 110 is used to indicate that either or both network devices 136, 138 may or may not interface to transport medium 110.

BTS 102 may be part of a radio access network (RAN) for performing wireless communications. The RAN may include one or more other BTSs in addition to BTS 102. BTS 102 forms a corresponding cell and/or cell sector by radiating RF signals away from BTS 102. The signals radiated away from BTS 102 form an RF air interface 116 and may be arranged according to one of the CDMA, TDMA, or OFDMA air interface protocols or some other air interface protocol.

The signals radiated away from BTS 102 may be arranged as multiple forward-link communication channels. The forward-link communication channels carry communications from BTS 102 to wireless communication device (WCD) 132 and/or one or more wireless communication devices.

As an example, in accordance with the CDMA air interface protocol, the multiple forward-link communication channels may include one or more of the following channels: a pilot channel, a medium access control channel, a control channel, a paging channel, and/or a traffic channel. The traffic channel may include a voice channel and/or a data channel. Other examples of forward-link communication channels and other examples of the quantity of forward-link communication channels that make up the RF air interface 116 are also possible.

RF air interface 116 may include one or more reverse-link communication channels that radiate towards BTS 102 from WCD 132 and/or one or more wireless communication devices. The one or more reverse-link communication channels carry communications from the one or more wireless communication devices and/or WCD 132 to BTS 102. The forward-link channels and the reverse-link channels of air interface 116 are arranged according to the same air interface protocol.

BTS 102 may be connected directly or indirectly to a variety of networks and/or network entities. For example, BTS 102 may be connected to a base station controller (BSC) that is connected to a telecommunications switch or gateway, such as a mobile switching center (MSC) or packet data serving node (PDSN). The switch or gateway may be connected with a transport network, such as the public switched telephone network (PSTN) or a packet-switched network (e.g., the Internet).

BTS 102 includes an antenna feed interface 117 that connects to antenna feed 112 and to an antenna feed 118. Antenna feed 112 connects BTS 102 to BTS-SC 106 (which connects to RAE 104 via transport medium 110 and signal conditioner 108). Antenna feed 118 connects BTS 102 to antenna 122, and provides a communication path between BTS 102 and antenna 122. BTS 102 may include one or more other antenna feeds (not shown) and one or more other antennas (not shown). Each of the other antenna feeds may be connected to one or more of the other antennas.

Antenna feed interface 117 may be arranged for one or more cell sectors. As an example, antenna feed interface 117 may be arranged to have (i) a first interface that connects to antenna feed 118 and is designated for a first cell sector, and (ii) a second interface that connects to antenna feed 112 and is designated for a second cell sector. Other exemplary arrangements of antenna feed interface 117 are also possible.

Each antenna feed described herein may include any means for carrying communications to and from BTS 102 or to and from RAE 104. As an example, antenna feed 112 may include one or more coaxial cables for carrying communications to BTS 102 from BTS-SC 106 and/or for carrying communications to BTS-SC 106 from BTS 102. Other exemplary means of an antenna feed carrying communications are also possible.

Antenna 122 may receive signals from RF air interface 116 and provide the received signals to BTS 102 via antenna feed 118. BTS 102 can receive other signals from other sources as well. For example, BTS 102 may be divided into multiple cell sectors and BTS 102 may receive signals sent from BTS-SC 106 via antenna feed 112.

BTS 102 may provide signals for a certain cell sector to antenna 122 via antenna feed 118. Another antenna feed 112, connected to another cell sector of BTS 102, can provide signals to RAE 104 via BTS-SC 106, transport medium 110, signal conditioner 108, and communication connection 114. Yet another cell sector of BTS 102 may be connected via another antenna feed to another antenna or to another network entity connected to BTS 102 via the other antenna feed. Alternatively, the signals provided to antenna feeds 112, 118 and the signals received from antenna fees 112, 118 may be for the same cell and/or the same cell sector of BTS 102.

Antenna 122 radiates signals to form a forward-link portion of RF air interface 116. BTS 102 may include amplifier circuitry (not shown) for amplifying the signals provided to antenna feed 118 so that the signals radiated from antenna 122 are of sufficient power for a given cell or cell sector.

DAS 103 may be a part of the RAN that includes BTS 102. DAS 103 includes RAE 104 and at least a portion of shared transport medium 110. DAS 103 may include one or more other remote antenna entities (e.g., SC-RAE 700) that each communicate with BTS 102 via BTS-SC 106, signal conditioner 108, and/or transport medium 110, or via other signal conditioners and/or transport mediums that may be a part of DAS 103. Each remote antenna entity may include amplifier circuitry for amplifying an RF signal to be provided to an antenna feed and in turn, an antenna for radiating the amplified signal over an RE air interface.

DAS 103 extends the cell and/or cell sector(s) (corresponding to BTS 102) by radiating signals away from RAE 104 and radiating signals away from the other remote antenna entities. The signals radiated away from RAE 104 form a forward-link portion of an RF air interface 124 and are arranged according to the same air interface protocol as the air interface protocol for RF air interface 116. Similarly, signals radiated away from the other remote antenna entities form respective forward-link portions of air interfaces arranged according to the same air interface protocol as the air interface protocol for RF air interface 116. The signals radiated away from RAE 104 in a forward-link direction and the signals radiated away from the other RAEs in a forward-link direction are identical or substantially identical to the signals radiated away from BTS 102 in a forward-link direction.

RAE 104 may include (i) an antenna feed interface 125, (ii) circuitry 126 for connecting to communication connection 114 and to antenna feed interface 125, and (iii) an antenna feed 127 for connecting to an antenna 128. Circuitry 126 may include circuitry for providing signals between communication connection 114 and antenna feed 127.

RAE 104 may include one or more other antenna feeds that connect to one or more other antennas. In this regard, antenna feed interface 125 may be arranged with (i) an interface that connects to antenna feed 127 and that is designated for a given cell sector, and (ii) one or more other interfaces that connect to the one or more other antenna feeds, each of which is designated for another cell sector.

System 100 provides means for performing wireless communications with multiple wireless communication devices. As shown in FIG. 1, WCD 132 may use RF air interface 116 to communicate wirelessly with BTS 102, and WCD 134 may use RF air interface 124 to communicate wirelessly with RAE 104. BTS 102 provides wireless service to both WCD 132 and WCD 134, however, the wireless service provided by BTS 102 to WCD 134 is carried out, in part, by DAS 103. One or more other wireless communication devices (not shown) may also perform wireless communications with BTS 102 and/or the remote antenna entities of DAS 103.

WCD 132 and WCD 134 may be any of a variety of wireless communication devices. In one respect, WCD 132 and/or WCD 134 may be a mobile WCD such as a mobile phone, a wireless personal digital assistant (PDA), or a portable computer having a wireless network interface card. Other examples of a mobile WCD are also possible.

In another respect, WCD 132 and/or WCD 134 may be a fixed WCD situated in a fixed location, such as an office or home. A fixed WCD typically derives electrical power from a utility source provided to the fixed location via an electrical power line, as opposed to a mobile WCD that normally derives electrical power from a battery. As an example, a fixed WCD may be a wireless local loop hub that provides an interface between (i) conventional landline telephone equipment located at a fixed location, and (ii) the PSTN via the MSC that connects to the BTS 102. Other examples of a fixed WCD are also possible.

BTS-SC 106 includes an interface to antenna feed 112 and an interface to transport medium 110. BTS-SC 106 includes means for receiving signals from antenna feed 112 and for conditioning these received signals for subsequent transmission over transport medium 110. BTS-SC 106 also provides means for receiving signals from transport medium 110 and for conditioning these received signals for subsequent transmission to BTS 102 via antenna feed 112. Additional details of BTS-SC 106 are described below with respect to FIG. 3.

Signal conditioner 108 includes an interface to communication connection 114 and an interface to transport medium 110. Signal conditioner 108 includes means for receiving signals from remote antenna entities (e.g., RAE 104) and for conditioning these received signals for subsequent transmission over transport medium 110. Signal conditioner 108 also provides means for receiving signals from transport medium 110 and for conditioning the received signals for subsequent transmission to remote antenna entity 104. Additional details of signal conditioner 108 are described below with respect to FIG. 4.

Shared transport medium 110 provides means for transporting a CDS. For example, transport medium 110 may provide means for transporting a CDS between BTS-SC 106 and signal conditioner 108, transporting a CDS between SC-RAE 700 and BTS-SC 106, and/or transporting a CDS between SC-RAE 700 and signal conditioner 108. Transportation of the CDS via transport medium 110 occurs by transporting the CDS as information data over transport medium 110. The CDS may comprise the total information to be radiated from an antenna of BTS 102 (e.g., the total information to be radiated for one cell sector) or the total information received at an RAE (or multiple RAEs). As an example, the total information may include the information associated with multiple phone calls and/or data sessions being handled by BTS 102, and control information for these multiple phone calls and/or data sessions.

A CDS transmitted over transport medium 110 may be generated in any of a variety of entities. For example, a CDS transmitted in a forward-link direction may be generated by BTS-SC 106 or BTS 102. BTS-SC 106 may receive from BTS 102 an RF signal (e.g., RF signal 200 shown in FIG. 2) carrying an analog baseband signal (hereinafter ABS-1). ABS-2 may represent digital signals to be sent via multiple forward-link channels, such as any combination of the forward-link channels described herein. BTS-SC 106 may demodulate RF signal 200 to recover ABS-1.

As an example, BTS-SC 106 (or BTS 102) may generate CDS 200 by recovering ABS-1 from RF signal 200, making power level measurements of ABS-1 at a clock rate interval for an air interface protocol defining multiple wireless communication channels (such as the multiple forward-link channels), encoding the least significant bit positions of CDS 200 with a binary bit pattern that represents one of the power level measurements, and encoding the most significant bit position of CDS 200 with a zero if the amplitude of ABS-1 is positive at the time when the power level measurement is made or a value of one if the amplitude of ABS-1 is negative at the time when the power level measurement is made.

The clock rate interval is based on the chip data rate at which data is encoded onto the signals (e.g., ABS-1) to be transmitted across the communication channels. As an example, for CDMA 1xRTT, the chip data rate is 1.2288 Mbps. The clock rate interval is 1/chip data rate. As an example, the clock rate interval may be between 800 nano seconds and 850 nano seconds. As another example, for CDMA 1xRTT, the clock rate interval may be 813.3 nano seconds. Other exemplary chip data rates and clock rate intervals are also possible. Table 1 lists data pertaining to generation and transmission of a CDS.

TABLE 1

| Number of Bits (X) | Maximum No. of Communication Channels = $(2^{(X-1)} - 1)$ | Bandwidth = (X * Chip Data Rate) (Chip Data rate for CDMA 1xRTT = 1.2288 Mbps) | Row # |
|---|---|---|---|
| 8 | 127 | 9.8304 Mbps | Row 1 |
| 7 | 63 | 8.6016 Mbps | Row 2 |
| 6 | 31 | 7.3728 Mbps | Row 3 |
| 5 | 15 | 6.1440 Mbps | Row 4 |
| Col. 1 | Col. 2 | Col. 3 | |

Column 1 specifies a value of X that indicates a number of bits each CDS will contain. For example, if X equals 8, then each CDS contains 8 bits. Of these 8 bits, the most significant bit (MSB) may indicate whether a portion of an analog baseband signal, at a given clock rate interval, has a positive amplitude or a negative amplitude, and the other 7 bits (i.e., the 7 least significant bits (LSBs)) represent a power value measurement of the analog baseband signal measured at the clock rate interval for an air interface protocol defining multiple wireless communication channels. An MSB of "1" may indicate the analog baseband signal has a negative amplitude and an MSB of "0" may indicate the analog baseband signal has a positive amplitude. As an example, if CDS 200 equals "01111010," then the MSB is "0" and the least significant bits (LSBs) are "1111010." Similarly, when X equals 5, 6, or 7, the MSB of a 5-bit CDS, a 6-bit CDS, or a 7-bit CDS, respectively, may indicate whether the amplitude of the analog baseband signal for the given chip period is positive or negative and the LSBs that follow the MSB may represent the power value measurement of the analog baseband signal for the given chip period. Values of X less than 5 or greater than 8 may also be used to generate a CDS.

Column 2 specifies a maximum number of communication channels that correspond to a given value of X. The maximum number of communication channels equals $(2^{(X-1)}-1)$. For example, if X equals 5, then the maximum number of communication channels equals 15. In this regard, the analog baseband signal may represent digital signals for a number of communication channels between 1 and 15 channels. If X equals 6, then the maximum number of communication channels equals 31 and the analog baseband signal may represent digital signals for a number of communication channels between 1 and 31 channels. Other values of the maximum number of communication channels are also possible.

Column 3 specifies an amount of bandwidth to be used to carry a CDS for digital signals modulated at a chip data rate of 1.2288 Mbps (i.e., the chip data rate for CDMA 1xRTT). As an example, the bandwidth values listed in Column 3 may indicate how much bandwidth of transport medium 110 is used to carry a CDS. The bandwidth values listed in Column 3 equal the value of X times the date rate of 1.2288 Mbps. Other chip data rates of another air interface protocol may be used to determine the amount of bandwidth used to carry a CDS.

BTS 102 and/or BTS-SC 106 may determine which value of X should be used to generate CDS 200. For example, a processor 312 (shown in FIG. 3) of BTS-SC 106 may execute program instructions to determine the value of X. Execution of the program instructions may include substituting a Maximum Number of Communication Channels value for the teem "Maximum Number of Communication Channels" in the equation "Maximum Number of Communication Channels= $(2^{(X-1)}-1)$" or substituting a bandwidth value for the term "Bandwidth" and a data rate value for the term "Data Rate" in the equation "Bandwidth=X*Data Rate."

As an example, a wireless carrier operating BTS 102 and DAS 103 may select the maximum number of channels value and enter that value via a user interface of BTS 102, such as an operations and maintenance user interface. BTS 102 may provide BTS-SC 106 with the maximum number of channels value. Processor 312 may execute the program instructions to determine the value of X by substituting the received value into the equation Maximum Number of Communication Channels=$(2^{(X-1)}-1)$. Alternatively, BTS 102 may execute the program instructions to determine the value of X based on the received maximum number of channels value and data rate value, and then provide the determined value of X to BTS-SC 106.

As another example, BTS-SC 106 may determine that RF signal 200 comprises digital signals for a given number of communication channels and then select a value of X corresponding to a maximum number of communication channels value that is equal to or greater than the given number of communication channels. BTS 102 may provide information to BTS-SC 106 that indicates the given number of channels. For example, BTS-SC 106 may receive information indicating that RF signal 200 comprises digital signals for 46 channels and then select a value of X corresponding to a maximum number of communication channels value of 63. Alternatively, BTS 102 may determine the given number of communication channels, select the value of X, and provide the value of X to BTS-SC 106 so that BTS-SC 106 generates CDSs having a number of bits equal to X. Other examples of how BTS 102 and/or BTS-SC 106 determine the value of X for generating a CDS are also possible.

As another example, a CDS destined to be transmitted in a reverse-link direction may be generated at signal conditioner 108. In this regard, RAE 104 may receive an RF signal (e.g., RF signal 210 shown in FIG. 2) over the air interface 124. RF signal 210 may carry an analog baseband signal (hereinafter "ABS-5") representing digital signals for multiple reverse-link channels, such as a combination of the reverse-link channels described herein. RAE 104 sends RF signal 210 to signal conditioner 108. Signal conditioner 108 may demodulate RF signal 210 so as to recover ABS-5 and thereafter generate a CDS (e.g., CDS 210A) according to any of the methods described herein for generating a CDS, such as by measuring the power level of ABS-5 and encoding CDS 210A based on the measured power level and the amplitude of ABS-5.

Shared transport medium 110 may be arranged in various configurations. In one respect, shared transport medium 110 may be arranged as a broadband wireline transport medium. As an example, a broadband wireline transport medium may be arranged as a coaxial cable transport medium, an optical fiber transport medium, a broadband over electrical power line transport medium, or a twisted pair of copper wires. As another example, a broadband wireline transport medium may be arranged as a transport medium in compliance with International Telecommunication Union—Telecommunications (ITU-T) recommendation G.993.2 entitled *Very-high-bit-rate Digital Subscriber Line* 2. Other examples of a broadband wireline transport medium are also possible.

In another respect, transport medium 110 may be arranged as a broadband wireless transport medium. As an example, a broadband wireless transport medium may be arranged as a transport medium using at least a portion (i.e., one or more frequencies) of a broadband radio spectrum (e.g., 2.495 GHz to 2.690 GHz), a free space optics transport medium, a millimeter wave transport medium, or a microwave radio transport medium. Other examples of a broadband wireless transport medium are also possible.

In yet another respect, shared transport medium 110 may be arranged as a transport medium for transporting (i) a CDS between BTS-SC 106 and signal conditioner 108, and (ii) other data traffic to be transmitted to a destination such as network device 136 or network device 138 without passing the other data traffic to BTS 102 and RAE 104. In this description, data traffic, transported over transport medium 110, that includes a CDS and some other signal and/or traffic is referred to as combined data traffic. The combined data traffic may include multiple CDSs and/or other data traffic.

A variety of data traffic along with one or more CDSs may be transmitted as combined data traffic via transport medium 110. As an example, data traffic may include data being transmitted over Ethernet in accordance with the Institute of Electrical and Electronic Engineers (IEEE) 802.3 standards. As another example, data traffic may include data being transmitted over a Synchronous Optical NETwork (SONET). As yet another example, data traffic may include cable television signals in accordance with CableLabs DOCSIS (Data Over Cable Service Interface Specification) standards. Other examples of data traffic that may be transmitted over transport medium 110 are also possible.

Antenna feed 112 provides a communication path between BTS 102 and BTS-SC 106. Multiple antenna feeds, each connected to a different cell sector of BTS 102, may provide communication paths for transporting signals between BTS 102 and BTS-SC 106.

Next, FIG. 2A depicts shared transport medium 110 carrying combined data traffic 206 in a forward-link direction towards signal conditioner 108 and SC-RAE 700. As an example, the combined data traffic 206 comprises CDS 200A, a CDS 201A, and/or other data traffic 204. The other data traffic 204 may be provided to transport medium 110, BTS 102, and/or BTS-SC 106 from network device 136 or some other network entity.

BTS-SC 106 may receive RF signal 200 from BTS 102. RF signal 200 may have signal conditioner 108 and/or RAE 104 as a destination. RF signal 200 carries ABS-1, which may represent all of the digital signals to be sent to signal conditioner 108 and/or RAE 104. BTS-SC 106 may demodulate RF signal 200 so as to recover ABS-1 and thereafter generate a CDS for each clock interval portion of ABS-1. As an example, BTS-SC 106 may generate CDS 200A from a given clock interval portion of ABS-1.

BTS-SC 106 may receive from BTS 102 an RF signal 201 having SC-RAE 700 as a destination. RF signal 201 may carry an analog baseband signal (hereinafter "ABS-2") representing all of the digital signals to be sent to SC-RAE 700. BTS-SC 106 may demodulate RF signal 201 so as to recover ABS-2 and thereafter generate a CDS for each clock interval portion of ABS-2. As an example, BTS-SC 106 may generate CDS 201A from a given clock interval portion of the ABS-2.

ABS-1 may represent digital signals for a first cell sector of BTS 102 and ABS-2 may represent digital signals for a second cell sector of BTS 102. ABS-1 and ABS-2, as well as ABS-3, ABS-4, ABS-5, ABS-6, ABS-7, and ABS-8 defined below, may each be encoded with digital signals at a given chip data rate for a given air interface protocol, such as the chip data rate of 1.2288 MBPS for the CDMA 1xRTT protocol.

CDS 200A, CDS 201A and the other data traffic 204 may be carried simultaneously over transport medium 110 as combined data traffic 206. CDS 200A, CDS 201A, and/or the other data traffic 204 may be combined to form the combined data traffic 206 or they may each be carried independently over independent carriers on transport medium 110.

In accordance with an embodiment in which the other data traffic 204 is provided to BTS-SC 106, the combined data traffic 206 may be formed at BTS-SC 106. Alternatively, the combined data traffic 206 may be formed by network device 136 or some other device remote from BTS-SC 106. The network device 136 may be operated by a service provider that operates and/or provides connectivity to transport medium 110.

Various methods may be used to combine CDS 200A, CDS 201A, and the other data traffic 204 so as to form the combined data traffic 206. For instance, the combined data traffic 206 may be formed by modulating CDS 200A, CDS 201A, and the other data traffic 204 using any of a variety of modulation techniques, such as BPSK (Binary Phase Shift Keying), QPSK (Quadrature Phase Shift Keying), or a higher-ordered QAM (Quadrature Amplitude Modulation). As an example, the combined data traffic 206 may be formed by (i) modulating CDS 200A onto a first set of sub-carriers or carriers, (ii) modulating CDS 201A onto a second set of sub-carriers or carriers, and (iii) modulating the other data traffic 204 onto a third set of sub-carriers or carriers. As another example, the combined data traffic 206 may be formed by modulating CDS 200A, CDS 201A, and the other data traffic 204 onto a single carrier, such as a single millimeter wave band carrier. Other examples of modulating CDS 200A, CDS 201A, and the other data traffic 204 are also possible.

As another example, CDS 200A, CDS 201A, and the other data traffic 204 may be combined to form the combined data traffic 206 by multiplexing CDS 200A, CDS 201A, and the other data traffic 204. CDS 200A, CDS 201A, and the other data traffic 204 may be multiplexed using any of a variety of multiplexing techniques such as Frequency Division Duplexing (FDD) or Time Division Multiplexing (TDM). Other exemplary multiplexing techniques for multiplexing CDS 200A, CDS 201A, and the other data traffic 204 are also possible.

As yet another example, the combined data traffic 206 may be formed by encapsulating CDS 200A, CDS 201A, and the other data traffic 204 as broadband packets, such as Ethernet packets specified by IEEE 802.3 standards. BTS-SC 106 may generate the Ethernet packets such that some of the Ethernet packets have a destination of signal conditioner 108, some of the Ethernet packets have a destination of SC-RAE 700, and some of the Ethernet packets have a destination other than signal conditioner 108 or SC-RAE 700. As an example, BTS-SC 106 may encapsulate (i) CDS 200A as payload in the Ethernet packets having signal conditioner 108 as a destination, (ii) CDS 201A as payload in the Ethernet packets having SC-RAE 700 as a destination, and (iii) the other data traffic 204 as payload in the Ethernet packets having a destination other than signal conditioner 108 or SC-RAE 700.

Alternatively, means other than BTS-SC 106, such as network device 136, may encapsulate the other data traffic 204 as payload of the Ethernet packets having a destination other than signal conditioner 108 or SC-RAE 700.

CDS 200A, CDS 201A, and/or the other data traffic 204 may be interleaved using any of a variety of interleaving techniques such as packet interleaving. Other exemplary techniques for interleaving CDS 200A, CDS 201A, and/or the other data traffic 204 are also possible.

After transmission of the combined data traffic 206 via transport medium 110, the combined data traffic 206 may be separated to recover CDS 200A, CDS 201A, and the other data traffic 204. In one respect, a device remote from both signal conditioner 108 and SC-RAE 700, such as network device 138, may separate the combined data traffic 206 and thereafter provide CDS 200A to signal conditioner 108, CDS 201A to SC-RAE 700, and the other data traffic 204 to a network for transmission, in turn, to an entity other than signal conditioner 108 or SC-RAE 700.

In another respect, (i) signal conditioner 108 may separate the combined data traffic 206 to recover CDS 200A and then provide the recovered CDS 200A to RAE 104, and (ii) SC-RAE 700 may separate the combined data traffic 206 to recover CDS 201A and then provide the recovered CDS 201A to a remote antenna entity portion of SC-RAE 700.

In yet another respect, after transmission of the combined data traffic 206 as Ethernet packets through transport medium 110, (i) signal conditioner 108 may receive the combined data traffic 206 and recover the Ethernet packets having signal conditioner 108 as a destination, and (ii) SC-RAE 700 may receive the combined data traffic and recover the Ethernet packets having SC-RAE 700 as a destination. The combined data traffic 206 may be provided to the destination other than signal conditioner 108 or SC-RAE 700 so that the Ethernet packets carrying the other data traffic 204 may be recovered at that destination.

Signal conditioner 108 may convert CDS 200A into an analog baseband signal (hereinafter ABS-3). ABS-3 may be identical or substantially identical to ABS-1. In this regard, ABS-3 represents the digital signals to be sent via forward-link communication channels. Signal conditioner 108 may modulate a carrier with ABS-3 so as to produce an RF signal 208 carrying ABS-3. In this way, any communication device receiving RF signal 208 can recover ABS-3 and effectively receive the digital signals for forward-link communication channels originally sent from BTS 102 via RF signal 200.

Similarly, SC-RAE 700 may convert CDS 201A into an analog baseband signal (hereinafter ABS-4). ABS-4 may be identical or substantially identical to ABS-2. In this regard, ABS-4 represents digital signals to be sent via forward-link communication channels via RF signal 201. SC-RAE 700 may modulate a carrier with ABS-4 so as to produce an RF signal 209 carrying ABS-4. In this way, any communication device receiving RF signal 209 can recover ABS-4 and effectively receive the digital signals for forward-link communication channels originally sent from BTS 102 via RF signal 201.

Next, FIG. 2B depicts shared transport medium 110 carrying combined data traffic 216 in a reverse-link direction towards BTS-SC 106. The combined data traffic 216 may comprise a CDS 210A, a CDS 211A, and/or other data traffic 214. The other data traffic 214 may be provided to transport medium 110 from signal conditioner 108, SC-RAE 700, network device 136 or some other network entity.

Signal conditioner 108 may receive from RAE 104 an RF signal 210 having BTS 102 and/or BTS-SC 106 as a destination. RF signal 210 may carry an analog baseband signal (hereinafter "ABS-5") representing all of the digital signals received at RAE 104 via multiple communication channels from one or more wireless communication devices. Signal conditioner 108 may demodulate RF signal 210 so as to recover ABS-5 and thereafter generate a CDS (e.g., CDS 210A) that represents all of the digital signals carried by RF signal 210 for a given chip period. CDS 210A may be generated in accordance with any method for generating a CDS.

SC-RAE 700 may receive an RF signal 211 having BTS 102 and/or BTS-SC 106 as a destination. RF signal 211 may carry an analog baseband signal (hereinafter "ABS-6") representing all of the digital signals received at SC-RAE 700 via multiple communication channels from one or more wireless communication devices. SC-RAE 700 may demodulate RF signal 211 so as to recover ABS-6 and thereafter generate a CDS (e.g., CDS 211A) that represents all of the digital signals carried by RF signal 211 for a given chip period. One or more WCDs that transmit digital signals to RAE 104 via RF signal 210 may be a WCD that transmits digital signals to SC-RAE 700 via RF signal 211.

CDS 210A, CDS 211A, and the other data traffic 214 may be carried simultaneously over the shared transport medium 110 as the combined data traffic 216. CDS 210A, CDS 211A, and/or the other data traffic 214 may be combined to form the combined data traffic 216 or they may be carried independently over independent carriers on transport medium 110. Any of the methods described for combining CDS 200A, CDS 201A, and/or the other data traffic 204 may be used to combine CDS 210A, CDS 211A, and/or the other data traffic 214.

As an example, CDS 210A, CDS 211A, and/or the other data traffic 214 may be combined at network device 138, which may be operated by a service provider that operates and/or provides connectivity to transport medium 110. As another example, CDS 210A and CDS 211A may be combined at either signal conditioner 108 or SC-RAE 700.

After transmission of the combined data traffic 216 via transport medium 110, the combined data traffic 216 may be separated to recover CDS 210A, CDS 211A, and the other data traffic 214. As an example, separating the combined data traffic 216 to obtain CDS 210A, CDS 211A, and the other data traffic 214 may be carried out at BTS-SC 106. As another example, separating the combined data traffic 216 to obtain CDS 210A, CDS 211A, and the other data traffic 214 may be carried out at a means remote from BTS-SC 106, such as at network device 136 or BTS 102. The recovered traffic data 214 recovered from the data traffic 216 may be provided to a network for transmission, in turn, to an entity other than BTS 102 or BTS-SC 106.

BTS-SC 106 may convert CDS 210A into an analog baseband signal (hereinafter ABS-7). ABS-7 may be identical or substantially identical to ABS-5. In this regard, ABS-7 may represent the digital signals to be sent via reverse-link communication channels to BTS 102 or BTS-SC 106 from signal conditioner 108. BTS-SC 106 may modulate a carrier with ABS-7 so as to produce an RF signal 218 carrying ABS-7. In this way, BTS 102 may receive RF signal 218 and recover ABS-7 and effectively receive the digital signals for reverse-link communication channels originally sent from the one or more wireless communication devices via RF signal 210. Alternatively, BTS-SC 106 may provide ABS-7 to BTS 102 without modulating ABS-7 on a carrier.

Similarly, BTS-SC 106 may convert CDS 211A into an analog baseband signal (hereinafter ABS-8). ABS-8 may be identical or substantially identical to ABS-6. In this regard, ABS-8 may represent the digital signals to be sent via reverse-link communication channels to BTS 102 or BTS-SC 106 from SC-RAE 700. BTS-SC 106 may modulate a carrier with ABS-8 so as to produce an RF signal 219 carrying ABS-8. In this way, BTS 102 may receive RF signal 219 and recover ABS-8 and effectively receive the digital signals for reverse-link communication channels originally sent from the one or more wireless communication devices via RF signal 211. Alternatively, BTS-SC 106 may provide ABS-8 to BTS 102 without modulating ABS-8 on a carrier.

Figure 3:
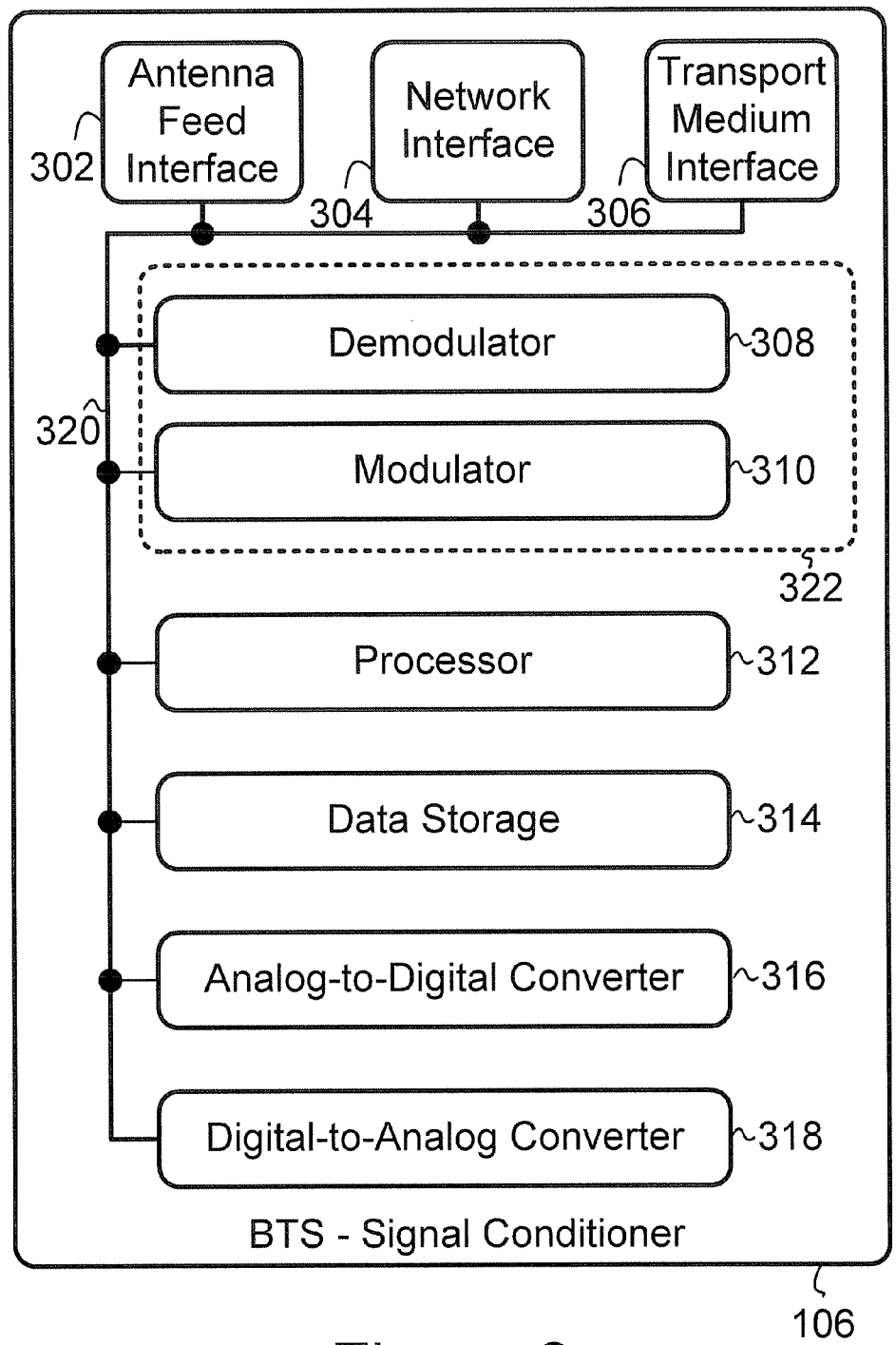
FIGS. 3 and 4 are block diagrams depicting details of exemplary signal conditioners.

Next, FIG. 3 is a block diagram of BTS-SC 106. BTS-SC 106 includes an antenna feed interface 302, a network interface 304 that may interface to network device 136, a transport medium interface 306, a demodulator 308, a modulator 310, a processor 312, data storage 314, an analog-to-digital converter (ADC) 316, and a digital-to-analog converter (DAC) 318, all linked together via a system bus, network, or other connection mechanism 320. Two or more of the components 302, 304, 306, 308, 310, 312, 314, 316, 318 may be combined as a single integrated component. For example, demodulator 308 and modulator 310 may be arranged as a modem 322.

Antenna feed interface 302 may interface to antenna feed 112 for communicating signals in a forward-link direction from BTS 102 and for communicating signals in a reverse-link direction to BTS 102. As an example, antenna feed interface 302 may receive RF signal 200 and/or RF signal 201 from BTS 102. As another example, antenna feed interface 302 may transmit to BTS 102 a CDS, such as CDS 210A or CDS 211A, or an RF signal, such as RF signal 218 or RF signal 219.

Network interface 304 may interface with a network, such as a wireless network and/or a wireline network that interfaces to network device 136. Network interface 304 may receive data traffic (e.g., the other data traffic 204) from the network and/or provide data traffic (e.g., the other data traffic 214) to the network. As an example, the wireline network may include a twisted pair of cables configured for performing Ethernet communications, an optical fiber network arranged as a SONET, a Hybrid Fiber-Coaxial (HFC) network for performing communications in accordance with the Data Over Cable Service Interface Specifications (DOCSIS) or another specification or protocol. Other exemplary networks that network interface 304 may interface with are also possible.

Transport medium interface 306 may interface with shared transport medium 110 by providing data to and/or receiving data from shared transport medium 110. For example, transport medium interface 306 may provide CDS 200A, CDS 201A and/or the other data traffic 204, independently or as combined data traffic 206, to shared transport medium 110 for transmission, in turn, to the destination(s) of CDS 200A, CDS 201A and/or the other data traffic 204. As another example, transport medium interface 306 may receive from shared transport medium 110 CDS 210A, CDS 211A, and/or the data traffic 214, independently or as combined data traffic 216.

Transport medium interface 306 may include multiple transport medium interfaces for interfacing to transport media. For example, transport medium interface 306 may include (i) a transport medium interface interfacing to a corresponding broadband wireline transport medium, and (ii) a transport medium interface interfacing to a corresponding broadband wireless transport medium.

Each of the multiple transport medium interfaces may be arranged as an interface card pluggable into and removable from a backplane. The backplane may be arranged for holding the transport media interfaces while the interfaces are operational. The arrangement of using pluggable and removable interface cards is advantageous for at least the reason that an entity operating the pluggable and removable interface cards may switch transport media interfaces at a preferred time. As an example, the preferred time to switch transport media interfaces may be when a particular transport medium interface stops functioning. As another example, the preferred time to switch transport medium interfaces may be after the entity (e.g., a wireless carrier) enters into an agreement with another entity operating a new shared transport medium.

Demodulator 308 may comprise one or more demodulators for demodulating signals. For example, demodulator 308 may include a first demodulator for demodulating signals received at antenna feed interface 302, a second demodulator for demodulating signals received at network interface 304, and a third demodulator for demodulating signals received from transport medium interface 306.

As an example, demodulator 308 may receive RF signal 200 from antenna feed interface 302 and demodulate RF signal 200 so as to recover ABS-1. Demodulator 308 may provide ABS-1 to another element of BTS-SC 106, such as processor 312. As another example, demodulator 308 may demodulate combined data traffic 216 so as to recover CDS 210A, CDS 211A, and/or data traffic 214, and then provide CDS 210A, CDS 211A, and/or data traffic 214 to another element of BTS-SC 106, such as antenna feed interface 302 or network interface 304.

Modulator 310 may comprise one or more modulators for modulating a carrier with a signal to be carried by the carrier. Each modulator of modulator 310 may be arranged in any of a variety of configurations. For example, modulator 310 may include a first modulator for modulating signals to be transmitted to network interface 304 or to transport medium interface 306. Modulator 310 may modulate a carrier in accordance with any of a variety of modulation schemes, such as Binary Phase Shift Keying (BPSK), Quadrature Phase Shift Keying (QPSK), 16-state Quadrature Amplitude Modulation (16QAM), or 256-state Quadrature Amplitude Modulation (256QAM), or any other modulation scheme now known or later developed.

As another example, modulator 310 may include a second modulator for modulating signals to be sent to antenna feed interface 302 and, in turn, antenna feed 112 and BTS 102. The second modulator may modulate signals in accordance with the CDMA, TDMA, OFDMA air interface protocol, or some other air interface protocol used by BTS 102.

Modulator 310 may receive from other elements of BTS-SC 106, such as demodulator 308 or processor 312, signals for modulating a carrier. As an example, modulator 310 may receive from demodulator 308 the CDS 200A generated from ABS-1 carried by RF signal 200. Thereafter, modulator 310 may modulate a carrier (e.g., a carrier or sub-carrier of transport medium 110) with CDS 200A so as to generate a signal carrying CDS 200A.

As indicated above, demodulator 308 and modulator 310 may be arranged as modem 322. Modem 322 may be any of a variety of modems known to those of skill in the art. For example, modem 322 may comprise a modem within a chipset identified as Mobile Station Modem™ (MSM™) and manufactured by Qualcomm, Inc. of San Diego, Calif. Qualcomm, Inc. manufactures a variety of MSM™ chipsets such as the MSM6800 chipset that supports CDMA2000 1X, CDMA2000 1XEV-DO, and GSM/GPRS networks. As another example, modem 322 may be a broadband over power line (BPL) modem. Other examples of modem 322 are also possible.

Processor 312 may comprise one or more processors (e.g., one or more general purpose processors and/or one or more digital signal processors). The one or more processors may include an application specific integrated circuit (ASIC), a field programmable gate array (FPGA), a programmable array logic (PAL) device, a complex programmable logic device (CPLD), or any other type of programmable processing device. Other examples of the processor 312 are also possible.

Processor 312 may execute program instructions stored in data storage 314. In response to executing the program instructions, processor 312 may cause antenna feed interface 302, network interface 304, transport medium interface 306, demodulator 308, and/or modulator 310 to carry out conditioning of signals and other functions described herein. As an example, processor 312 may execute program instructions that (i) cause demodulator 308 to demodulate RF signal 200 so as to recover ABS-1, (ii) to generate a CDS (e.g., CDS 200A), and (iii) to encapsulate the CDS into a set of broadband data packets.

Data storage 314 comprises a computer readable medium. A computer readable medium may comprise volatile and/or non-volatile storage components, such as optical, magnetic, organic or other memory or disc storage, which can be integrated in whole or in part with processor 312.

Various program instructions may be stored at data storage 314. As an example, the program instructions may include instructions executable by processor 312 to cause transport medium interface 306 to provide CDS 200A, CDS 201A, and/or the other data traffic 204 to transport medium 110. As another example, the program instructions may include instructions that cause network interface 304 or transport medium interface 306 to send to RAE 104 data that indicates (i) a first frequency for transmitting RF signal 208 signal over air interface 124 from antenna 128, and/or (ii) a second frequency for antenna 128 to receive RF signal 210. As yet another example, the program instructions may include instructions that cause processor 312 to generate a CDS according to a method described herein.

As still yet another example, the program instructions may include instructions that cause processor 312 to select (for use) a particular transport medium interface, from among multiple transport medium interfaces of transport medium interface 306 that interface with transport medium 110. For instance, these program instructions may include instructions for responding to a message, received from a remote device (e.g., a remote signal conditioner or another network entity), that indicates the particular transport medium interface should be selected. The remote device may send the message in response to detecting that a previously selected transport medium has failed (e.g., not performing communications). Other examples of program instructions storable in data storage 314 are also possible.

ADC 316 may convert analog baseband signals to combined digital signals. In this regard, ADC 316 may make the power measurements of an analog baseband signal. DAC 318 may convert combined digital signals to analog baseband signals.

In an alternative embodiment, BTS 102 may comprise any of the components shown in the BTS-SC 106. For example, BTS 104 may comprise the network interface 304, the transport medium interface 306, the processor 312, data storage 314, and/or the modem 322. In this regard, modem 322, data storage 314, and/or the processor 312 may carry out other functions typically carried out by a BTS.

Additionally, other details pertaining to a BTS-SC are provided in U.S. Patent Application No. TBD, entitled "System and Method for Indoor Wireless Service Distribution via Ultra-wideband Signals, and Aggregation of Combined Digital Signals for Wireless Service," which is incorporated by reference herein for all purposes.

Figure 4:
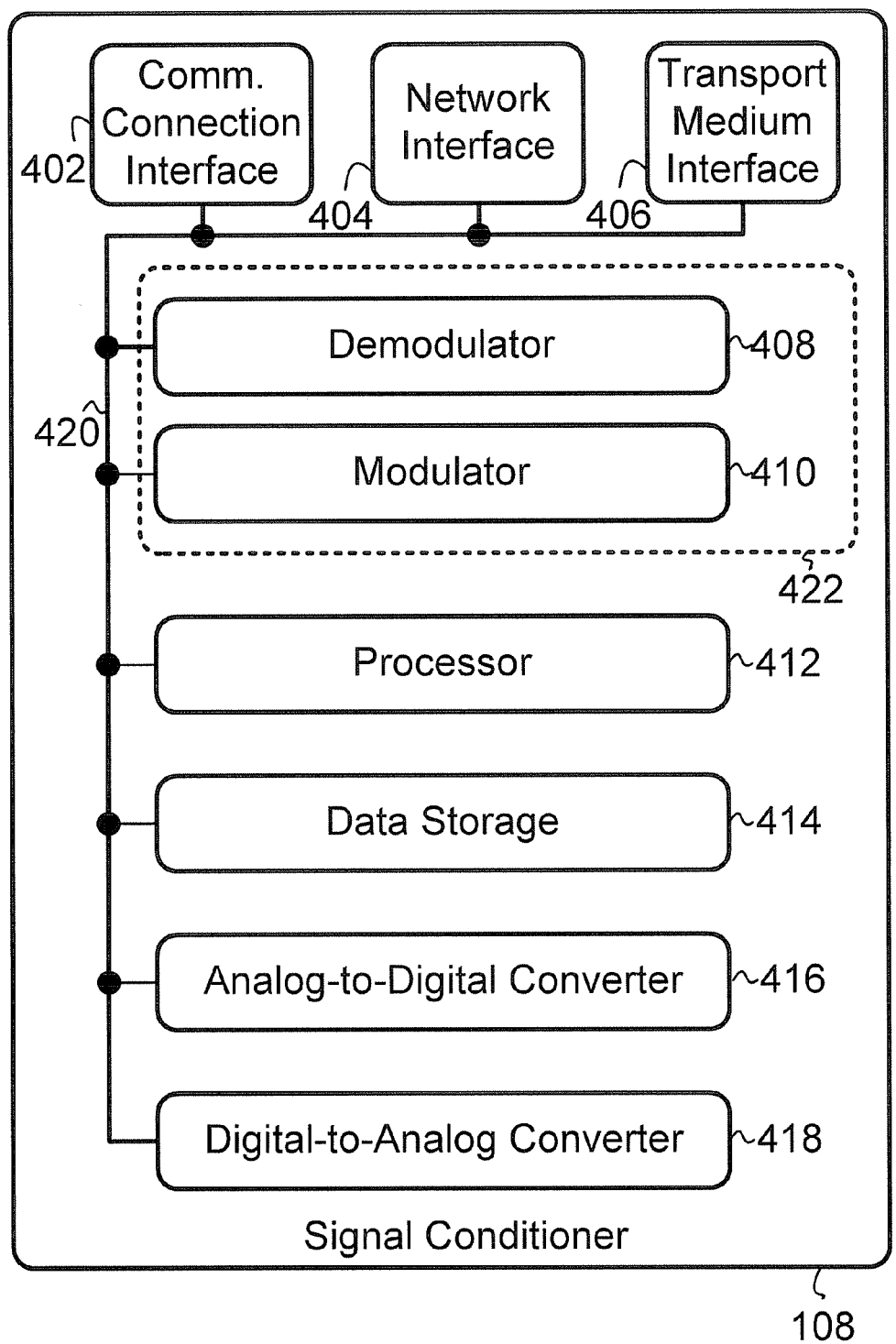

Next, FIG. 4 is a block diagram depicting details of signal conditioner 108. Signal conditioner 108 includes a communication connection interface 402 that interfaces to communication connection 114 (and, in turn, to RAE 104 via communication connection 114), a network interface 404 that may interface to network device 138, a transport medium interface 406, a demodulator 408, a modulator 410, a processor 412, data storage 414, ADC 416, and DAC 418, all linked together via a system bus, network, or other connection mechanism 420. Alternatively, one or more of the components 402, 404, 406, 408, 410, 412, 414, 416, 418 may be arranged as a single integrated component. For example, demodulator 408 and modulator 410 may be arranged as a modem 422.

One or more of components 404, 406, 408, 410, 412, 414, 416, 418 may be identical to components 304, 306, 308, 310, 312, 314, 416, 418 respectively. However the interface components of BTS-SC 106 and the interface components of signal conditioner 108 may interface to different entities or at different locations of a common entity. For example, communication connection interface 402 connects to RAE 104 via communication connection 114, whereas, antenna feed interface 302 connects to BTS 102 via antenna feed 112. As another example, network interface 304 may interface to a first data transport network and network interface 404 may interface to a second data transport network. As yet another example, transport medium interface 306 interfaces to transport medium 110 at a first location and transport medium interface 406 interfaces to transport medium interface 110 at a second location.

Demodulator 408 may comprise one or more demodulators for demodulating signals. For example, demodulator 408 may include a first demodulator for demodulating signals received at communication connection interface 402, a second demodulator for demodulating signals received at network interface 404, and a third demodulator for demodulating signals received from transport medium interface 406.

As an example, demodulator 408 may receive RF signal 210 from communication connection interface 402 and then demodulate RF signal 210 so as to recover an analog baseband signal representing digital signals transmitted over multiple communication channels from one or more WCDs, and then provide the recovered analog baseband signal to another element of signal conditioner 108, such as processor 412. As another example, demodulator 408 may demodulate combined data traffic 206 so as to recover CDS 200A, CDS 201A, and/or the other data traffic 204, and then provide CDS 200A, CDS 201A, and/or the other data traffic 204 to another element of signal conditioner 108, such as communication connection interface 402 or network interface 404.

Modulator 410 may comprise one or more modulators for modulating a carrier with a signal to be carried by the carrier. Each modulator of modulator 410 may be arranged in any of a variety of configurations. For example, modulator 410 may include a first modulator for modulating a first carrier to be sent via communication connection interface 402, a second modulator for modulating a second carrier to be sent via network interface 404, and a third modulator for modulating a third carrier to be sent via transport medium interface 406. In this way, modulator 410 may modulate an RF carrier with a CDS so as to generate an RF signal carrying the CDS. An RF carrier modulated by modulator 410 may comprise a carrier having a frequency substantially identical to a frequency of an RF carrier modulated at BTS 102 to generate RF signal 200.

Processor 412 may execute program instructions stored in data storage 414. The program instructions executed by processor 412 may be similar to the instructions executed by processor 312 except that the instructions executed by processor 412 are for communicating data from signal conditioner 108 in a forward-link direction to RAE 104 or from signal conditioner 108 in a reverse-link direction towards BTS 102 via transport medium 110.

ADC 420 may convert analog baseband signals to combined digital signals. In this regard, ADC 420 may make the power measurements of an analog baseband signal. DAC 418 may convert combined digital signals to analog baseband signals.

Figure 7:
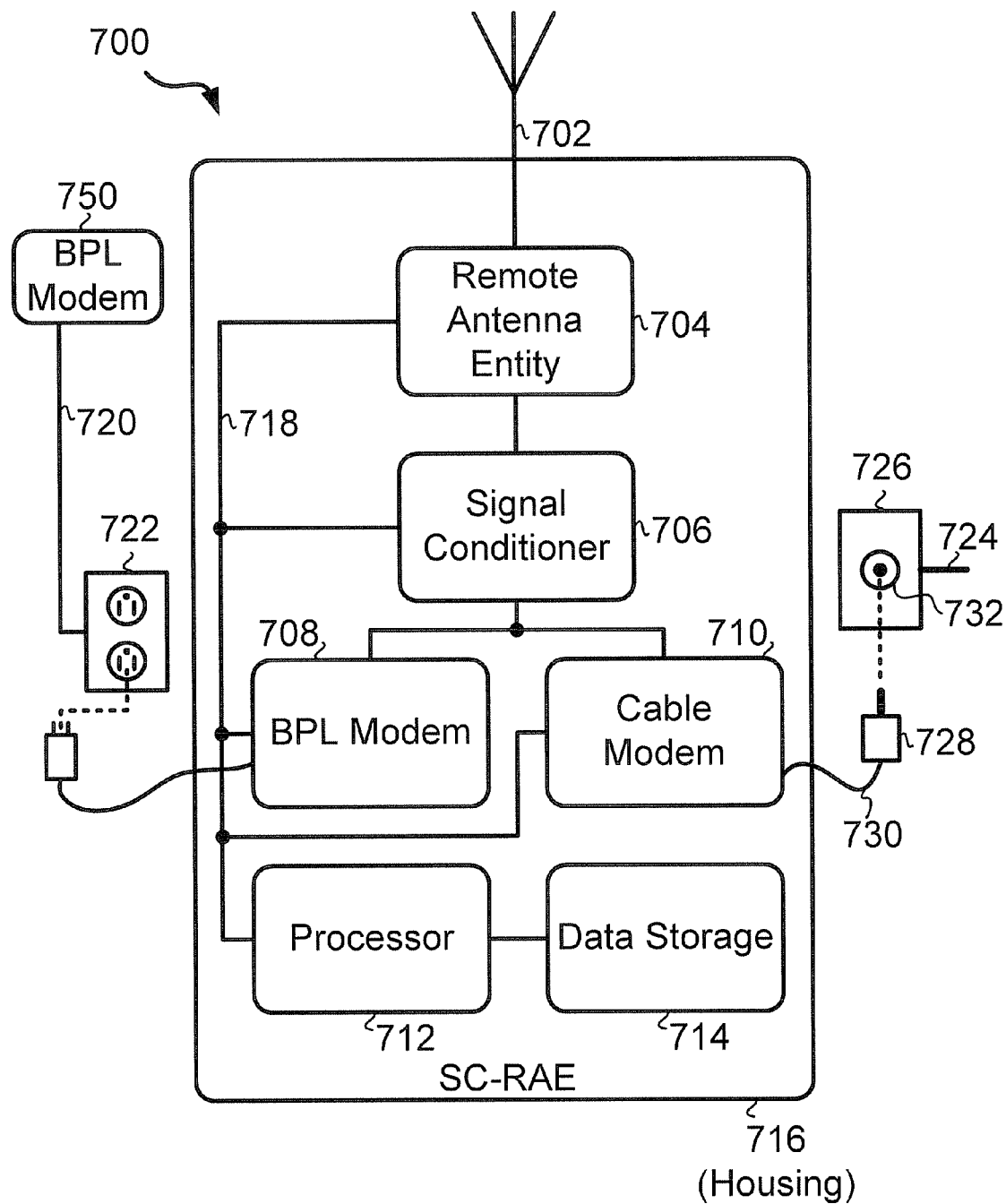
FIG. 7 is a block diagram of an exemplary signal conditioning remote antenna entity (SC-RAE)

Next, FIG. 7 is a block diagram of SC-RAE 700 in accordance with an exemplary embodiment of the present invention. SC-RAE 700 may include an antenna 702, an RAE 704, a signal conditioner 706, a broadband over power line (BPL) modem 708, a cable modem 710, a processor 712, data storage 714, and a housing 716. SC-RAE 700 may include a system bus, network, or other connection mechanism 718 that links together antenna 702, RAE 704, signal conditioner 706, BPL modem 708, cable modem 710, processor 712 and/or data storage 714.

For purposes of example in this description, elements 702, 704, 706, 708, 710, 712, 714, 718 of SC-RAE 700 will hereinafter be referred to as the 'SC-RAE elements.' Any of the SC-RAE elements, in whole or in part, may be located within housing 716. For example, antenna 702, RAE 704, and signal conditioner 706 may be located within housing 716. As another example, RAE 704 and signal conditioner 706 may be located within housing 716, whereas antenna 702 may be located external to housing 716 or located partially external to housing 716.

Housing 716 may be arranged in any of a variety of configurations. For example, housing 716 may be made of any material, such as plastic or metal, suitable for housing the SC-RAE elements. As another example, housing 716 may include fasteners, such as rivets and screws, and/or may snap together. As yet another example, housing 716 may include one or more seals to prevent moisture from entering housing 716. Other exemplary configurations of housing 716 are also possible.

RAE 704 connects to antenna 702. Antenna 702 may include one or more antennas, such as an antenna that transmits RF signals and receives RF signals, or an antenna to transmit RF signals away from SC-RAE 700 in a forward-link direction and another antenna to receive RF signals at SC-RAE 700 in a reverse-link direction. RAE 704 may include filter circuitry for filtering RF signals received from antenna 702 so as to isolate a desired frequency range of the received RF signals. For example, the desired frequency range may include a frequency range for reverse-link communication channels carrying digital signals destined for BTS 102 or for a cell sector of BTS 102.

In regard to the forward-link direction, RAE 704 may receive RF signal 209 from signal conditioner 706. RF signal 209 may be generated at signal conditioner 706. RAE 704 may provide RF signal 209 to antenna 702 for transmission of RF signal 209 away from RAE 704 and antenna 702 and, in turn, to one or more WCD, such as WCD 134.

In regard to the reverse-link direction, RAE 704 may receive RF signal 211 from antenna 702. RF signal 211 may have a destination of BTS 102, BTS-SC 106, and or one or more wireless communication devices. RF signal 211 carries ABS-6, which represents digital signals transmitted via multiple communication channels from one or more WCDs, such as WCD 134 and/or one or more other WCDs. These digital signals may represent all of the digital signals for a given cell sector of BTS 102.

BPL modem 708 may connect to an electrical power line 720 via an electrical outlet 722 so as to allow BPL modem 708 to perform bi-directional communications over power line 720. Electrical outlet 722 may be located within a customer premises (e.g., indoors). Transport medium 110 of FIG. 1 may be or may include power line 720. Power line 720 may carry an electrical current signal to and from BPL modem 708. The electrical current signal may be any of a variety of electrical signals, such as a 120 VAC, 60 Hz. electrical signal typically provided to houses and buildings in the United States, a 240 VAC, 50 Hz. electrical signal typically provided to houses and buildings in Europe, or another electrical signal.

BPL modem 708 may be arranged in any of a variety of configurations. For example, BPL modem 708 may be based on any Power Line Communications (PLC) industry standard technology such as IEEE P1901, HomePlug, or Universal Powerline Association (UPA). As another example, BPL modem 708 may use any of a variety of modulation techniques to modulate electrical current signals for transportation of a CDS over power line 720. For example, BPL modem 708 may modulate an electrical current signal according to OFDMA, TDMA, CDMA, or another modulation technique. BPL modem 708 may include Ethernet ports and/or RJ-11 ports for telephony.

For forward-link communications, an electrical current signal received at BPL modem 708 from power line 720 may carry a CDS, such as CDS 201A generated at BTS-SC 106. The electrical current signal may carry CDS 201A as payload of broadband packets and BPL modem 708 may demodulate the received electrical current signal so as to recover the broadband packets having CDS 201A as payload and then BPL modem 708 may recover CDS 201A from the broadband packets. Alternatively, BPL modem 708 may provide the broadband packets to signal conditioner 706 for so that signal conditioner 706 may recover CDS 201A.

For reverse-link communications, BPL modem 708 may receive a CDS, such as CDS 211A, from signal conditioner 706 and modulate an electrical current signal (received from power line 720) with CDS 211A so as to convert the received electrical current signal into a modulated electrical current signal carrying CDS 211A. BPL modem 708 may provide the modulated electrical current signal carrying CDS 211A to power line 720 for transmission over power line 720 to a BPL modem 750 located at a far-end of power line 720. The BPL modem 750 may recover CDS 211A from the modulated electrical current signal and thereafter provide CDS 211A to BTS-SC 106 or to BTS 102. As an example, the BPL modem 750 may be located at signal conditioner 108 such that signal conditioner 108 may recover CDS 211A and then provide the recovered CDS 211A to transport medium 110 for transmission to BTS-SC 106. As another example, BPL modem 750 may be located at signal conditioner 106.

Cable modem 710 may connect to an HFC network 724 via an HFC coaxial cable outlet 726 so as to allow cable modem 710 to perform bi-directional communications over HFC network 724 according to the Data Over Cable Service Interface Specification (DOCSIS) or according to another specification. HFC coaxial cable outlet 726 may be located within a customer premises.

Cable modem 710 may include an F-connector 728 and coaxial cable 730 such as an RG-6/U or RG-59/U coaxial cable. The F-connector 728 may be a male F-connector or a female F-connector. Cable modem 710 may also include Ethernet interface ports and RJ-11 ports for telephony.

HFC network 724 may be arranged in various configurations. For example, HFC network 724 may include an F-connector 732 connectable to the F-connector 728 of cable modem 710. As another example, HFC network 724 may include a headend office, a distribution center, optical fiber nodes that convert optical signals to electrical signals or electrical signals to optical signals, optical cables for carrying the optical signals, and coaxial cables for carrying the electrical signals. These optical signals and electrical signals may include carrier signals transporting a CDS to or from cable modem 710. Transport medium 110 of FIG. 1 may be or include HFC network 724.

Signal conditioner 706 may be arranged in any of a variety of configurations. For example, signal conditioner 706 may include a demodulator, such as demodulator 410, and a modulator, such as modulator 408. As another example, signal conditioner 706 may be integrated with processor 712 (e.g., as a digital signal processor).

In one respect, signal conditioner 706 may (e.g., by demodulation) recover CDS 201A from combined data traffic 206 transmitted in a forward-link direction from BTS-SC 106 to SC-RAE 700 via electrical power line 720 and/or HFC network 724. For example, CDS 201A may be recovered from a forward-link broadband sub-carrier typically having a bandwidth of 6 MHz and a center frequency between 700 MHz and 850 MHz. Thereafter, signal conditioner 706 may convert CDS 201A to ABS-4 and modulate ABS-4 onto an RF carrier so as to produce RF signal 209. This RF carrier may be a carrier having a frequency suitable for transmission from antenna 702, such as a carrier having a center frequency between 1,850 MHz and 1,910 MHz.

In another respect, signal conditioner 706 may (e.g., by demodulation) recover ABS-6 from RF signal 211 transmitted in a reverse-link direction over multiple channels from one or more WCDs. ABS-6 may have a destination of BTS-SC 106, BTS 102, and/or one or more wireless communication devices. After recovering ABS-6, signal conditioner 706 may generate a CDS, (e.g., CDS 211A) based on ABS-6 using any of the methods described herein, such as by measuring the power level of ABS-6 and encoding the CDS based on the measured power level.

After generation of CDS 211A, signal conditioner 706 may provide CDS 211A to BPL modem 708 for modulation onto an electrical current signal. Alternatively, or in combination, signal conditioner 706 may provide CDS 211A to cable modem 710 for modulation onto an RF signal having a frequency suitable for transmission over HFC network 724. As an example, signal conditioner 706 may modulate CDS 211A onto an RF signal (e.g., a sub-carrier of HFC network 724) having a bandwidth of approximately 6 MHz and a center frequency between 5 MHz and 42 MHz. As another example, signal conditioner 706 may encode a set of broadband packets with CDS 211A as payload of the packets, and thereafter modulate the set of broadband packets onto an RF carrier for carrying CDS 211A as payload of the set of packets over the HFC network 724.

Processor 712 may include one or more processors (e.g., one or more general purpose processors and/or one or more digital signal processors). The one or more processors may include an ASIC, an FPGA, a PAL, a CPLD, or any other type of programmable processing device.

Data storage 714 may include program instructions executable by processor 712. In general, these program instructions may cause processor 712 to control operation of the elements of SC-RAE 700. In particular, for example, these program instructions may include instructions that cause processor 712 to determine whether SC-RAE 700 can communicate via HFC network 724 and/or power line 720 and to responsively cause SC-RAE 700 to operate in a particular mode, such as one of the modes shown in Table 2.

TABLE 2

SC-RAE Operating Modes

| | Signal Conditioner provides/receives CDS to/from BPL Modem | Signal Conditioner provide/receives CDS to/from Cable Modem |
|---|---|---|
| Mode 1 | Yes | No |
| Mode 2 | No | Yes |
| Mode 3 | Yes | Yes |

In one respect, execution of the program instructions may cause processor 712 to determine SC-RAE 700 should operate in mode 1. In mode 1, processor 712 may cause signal conditioner 706 to provide a CDS generated at signal conditioner 706 to BPL modem 708 for transmission of this CDS over power line 720. Further, in mode 1, BPL modem 708 may receive from power line 720 an electrical current signal carrying a CDS generated at BTS-SC 106, recover the CDS from the electrical signal, and then provide the recovered CDS to signal conditioner 706.

Processor 712 may cause SC-RAE 700 to operate in mode 1 in response to making any of a variety of determinations. For example, processor 712 may determine a failure in cable modem 710 and/or HFC network 724 has occurred such that SC-RAE 700 can communicate via power line 720 but not via HFC network 724. In this regard, while cable modem 710 and/or HFC network 724 is/are failing to operate properly, mode 1 may be the mode in which SC-RAE 700 operates.

As another example, processor 712 may compare quality of service (QoS) values to QoS thresholds (e.g., predetermined data values) stored in data storage 714. The QoS values may indicate the QoS being provided by HFC network 724 and/or cable modem 710. The QoS values may include: (i) a number of data packets dropped by HFC network 724 over a given period of time, (ii) a bit error rate, (iii) an indication of variation of an amount of delay of data packets arriving at a destination (e.g., signal conditioner 108), and/or (iv) an indication of a number of data packets arriving out-of-order at the destination. If processor 712 determines that one or more of the compared QoS values exceeds a corresponding QoS threshold, processor 712 may cause SC-RAE 700 to operate in mode 1. Other examples of how processor 712 determines SC-RAE 700 should operate in mode 1 are also possible.

In another respect, execution of the program instructions may cause processor 712 to determine SC-RAE 700 should operate in mode 2. In mode 2, processor 712 may cause signal conditioner 706 to provide a CDS generated at signal conditioner 706 to cable modem 710 for transmission of this CDS over HFC network 724. Further, in mode 2, cable modem 710 may receive from HFC network 724 an electrical signal carrying a CDS generated at BTS-SC 106, recover the CDS from the electrical signal, and then provide the recovered CDS to signal conditioner 706.

Processor 712 may cause SC-RAE 700 to operate in mode 2 in response to making any of a variety of determinations. For example, processor 712 may determine a failure in power line 720 and/or BPL modem 708 has occurred such that SC-RAE 700 can communicate via HFC network 724 but not via power line 720. In this regard, while the power line 720 and/or BPL modem 708 is/are failing to operate properly, mode 2 may be the mode in which SC-RAE 700 operates.

As indicated above, processor 712 may compare quality of service (QoS) values to QoS thresholds. By way of another example, if one or more of the QoS values exceeds a corresponding QoS threshold, processor 712 may determine SC-RAE 700 should operate in mode 2. In accordance with this example, the QoS values may indicate the QoS being provided by power line 720 and/or BPL modem 708. These QoS values may include: (i) a number of data packets dropped by power line 720 over a given period of time, (ii) a bit error rate, (iii) an indication of variation of an amount of delay of data packets arriving at a destination (e.g., signal conditioner 108), and/or (iv) an indication of a number of data packets arriving out-of-order at the destination. Other examples of how processor 712 determines SC-RAE 700 should operate in mode 2 are also possible.

In yet another respect, execution of the program instructions may cause processor 712 to determine SC-RAE 700 should operate in mode 3. In mode 3, processor 712 may cause signal conditioner 706 to provide a CDS generated at signal conditioner 706 to (i) BPL modem 708 for transmission of the generated CDS over power line 720, and (ii) cable modem 710 for transmission of the generated CDS over HFC network 724. In this way, the same generated CDS may be transmitted over two paths to provide redundant communications of the generated CDS to BTS 102. Signal conditioner 706 may provide the generated CDS to cable modem 710 and to BPL modem 708 at substantially the same time. Signal conditioner 706 may amplify the generated CDS before providing the signal to cable modem 710 and BPL modem 708.

Processor 712 may determine SC-RAE 700 should operate in mode 3 by making any of a variety of determinations. For example, processor 712 may make the same determinations regarding QoS as defined above to determine whether SC-RAE 700 should operate in either mode 1 or mode 2. However, instead of switching from mode 1 to mode 2 or from mode 2 to mode 1 in response to determining one or more QoS values exceeds a corresponding QoS threshold, processor 712 may cause SC-RAE 700 to operate in mode 3 such that SC-RAE 700 communicates using both BPL modem 708 and cable modem 710.

3. Exemplary Operation a. Data Communications—BTS to DAS

Figure 5:
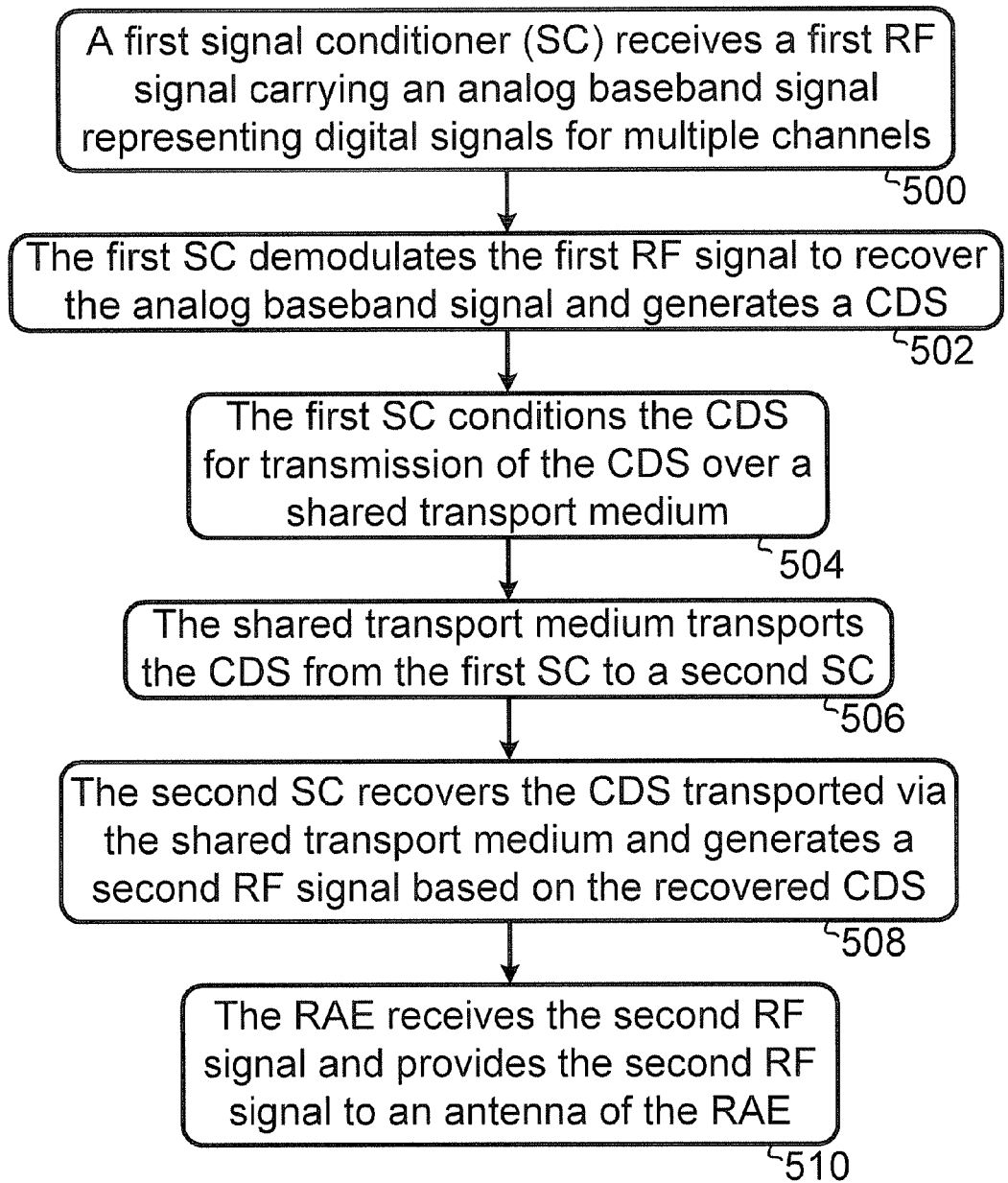
FIG. 5 is a flow chart depicting a set of functions that can be carried out in accordance with an exemplary embodiment for use in communicating data from a base transceiver station to a remote antenna entity.

FIG. 5 is a flow chart provided to illustrate a set of functions that may be carried out in accordance with an exemplary embodiment of the present invention. The functions shown in FIG. 5 may be used to perform communications from BTS 102 to DAS 103 and in particular from BTS 102 to RAE 104 and/or from BTS 102 to SC-RAE 700.

At block 500, a first signal conditioner (e.g., BTS-SC 106) receives a first RF signal (e.g., RF signal 200) carrying an analog baseband signal (e.g., ABS-1) representing digital signals for multiple communication channels. The digital signals for multiple communication channels may be destined for one or more wireless communication devices communicating via BTS 102 and DAS 103. BTS 102 may generate RF signal 200 and BTS-SC 106 may receive RF signal 200 from BTS 102 via antenna feed 112.

The multiple channels may include communication channels and control channels. The multiple channels may comprise forward-link channels in accordance with any air interface protocol. For example, the multiple channels may include forward-link channels in accordance with the CDMA, TDMA, OFDMA air interface protocol or some other air interface protocol. Other examples of the multiple communication channels and control channels are also possible.

BTS 102 may generate RF signal 200 by modulating a first carrier with ABS-1. The first carrier may be an RF signal suitable for transmission to antenna feed 118 for transmission, in turn, from antenna 122. ABS-1 may represent the digital signals for multiple channels in accordance with the CDMA, TDMA, OFDMA air interface protocol or some other air interface protocol.

BTS-SC 106 may receive RF signal 200 at antenna feed interface 302. In response to receiving RF signal 200, antenna feed interface 302 may provide RF signal 200 to demodulator 308 via connection mechanism 320.

Next, at block 502, the first signal conditioner (e.g., BTS-SC 106) demodulates the RF signal (e.g., RF signal 200) to recover the analog baseband signal (e.g., ABS-1) and generates a CDS (e.g., CDS 200A). Demodulation of RF signal 200 may be carried out by demodulator 308. Demodulator 308 may provide the recovered ABS-1 to processor 312 and/or ADS 316 for subsequent generation of CDS 200A according to any of the methods described herein, such as by measuring the power level of ABS-1 and encoding the CDS based on the measured power level and an amplitude of ABS-1.

Next, at block 504, the first signal conditioner (e.g., BTS-SC 106) conditions the CDS (e.g., CDS 200A) for transmission of the CDS over a transport medium 110. Conditioning CDS 200A may include conditioning CDS 200A for transmission of CDS 200A over any of a variety of transport media (e.g., a wireless transport medium or a wireline transport medium such as electrical power line 720 or HFC network 724).

In one respect, modulator 310 may cant' omit at least a portion of the conditioning of the CDS 200A. For example, modulator 310 may modulate a second carrier with CDS 200A so as to generate an RF signal carrying CDS 200A. Modulator 310 may provide the RF signal carrying CDS 200A to transport medium interface 306 for transmission of the RF signal over transport medium 110 or to processor 312 for additional conditioning of CDS 200A.

In another respect, processor 312 may receive CDS 200A from modulator 310 or from demodulator 308 and thereafter execute program instructions to carry out at least a portion of the conditioning of CDS 200A. Processor 312 may condition CDS 200A in various ways. For example, processor 312 may execute program instructions that cause CDS 200A to be combined with CDS 201A and/or the other data traffic 204 so as to generate the combined data traffic 206. As another example, processor 312 may execute program instructions to condition CDS 200A by interleaving or multiplexing CDS 200A with CDS 201A and/or the other data traffic 204. As yet another example, processor 312 may execute program instructions to condition CDS 200A by packetizing CDS 200A as payload of a set of broadband packets. The set of broadband packets may be Ethernet packets as specified by IEEE 802.3 standards. Other examples of processor 312 executing program instructions to condition CDS 200A are also possible.

After conditioning CDS 200A, CDS 200A may be provided to transport medium interface 306 for subsequent transmission of CDS 200A over shared transport medium 110. Alternatively, if BTS-SC 106 combines CDS 200A with CDS 201A and/or the other data traffic 204 to form the combined data traffic 206, then BTS-SC 106 may provide CDS 200A to shared transport medium 110 by providing the combined data traffic 206 to transport medium 110. CDS 201A or one or more other CDSs may be conditioned using the same methods described above to condition CDS 200A.

Next, at block 506, the shared transport medium 110 transports the CDS (e.g., CDS 200A) from the first signal conditioner (e.g., BTS-SC 106) to a second signal conditioner (e.g., signal conditioner 108). Additionally, or alternatively, transport medium 110 may transport CDS 200A to one or more other signal conditioners, such as SC-RAE 700.

In one respect, transmission of CDS 200A over shared transport medium 110 may be carried out via a single transport medium, such as a broadband wireless transport medium or a broadband wireline transport medium (e.g., power line 720 or HFC network 724). In another respect, transmission of CDS 200A over shared transport medium 110 may be carried out via transport media such as a broadband wireless transport medium and a broadband wireline transport medium. In this regard, CDS 200A may be transmitted over both the broadband wireless transport medium and the broadband wireline transport medium substantially simultaneously. In yet another respect, transmission of CDS 200A may be carried out by the transmission of combined data traffic 206 over the shared transport medium.

Signal conditioner 108 may receive CDS 200A separately or within the combined data traffic 206 that includes CDS 200A, and CDS 201A and/or the other data traffic 204. Signal conditioner 108 may receive CDS 200A at transport medium interface 406.

Next, at block 508, the second signal conditioner (e.g., signal conditioner 108) recovers the CDS (e.g., CDS 200A)

transported via the transport medium (e.g., transport medium 110) and generates a second RF signal (e.g., RF signal 208) based on the recovered CDS.

Signal conditioner 108 may recover CDS 200A using a method appropriate for how CDS 200A is transported across transport medium 110. For example, if CDS 200A is transported across transport medium 110 via an RF carrier, CDS 200A may be recovered by demodulator 408 demodulating the RF carrier. As another example, if CDS 200A is transported across transport medium 110 as payload of broadband packets, signal conditioner 108 may include a protocol handler for recovering CDS 200A from the broadband packets.

In accordance with the example in which CDS 200A is transported across transport medium 110 as combined data traffic 206, various methods may be used to recover CDS 200A. For example, signal conditioner 108 may receive the combined data traffic 206 at transport medium interface 406 and responsively provide the combined data traffic 206 to processor 412. Processor 412 may execute program instructions to (i) separate the combined data traffic 206 to recover CDS 200A, and CDS 201A, and/or the other data traffic 204, (ii) condition the recovered CDS 200A, (e.g., by providing CDS 200A to demodulator 408 if CDS 200A is modulated), or perform other conditioning methods if the CDS 200A is packetized as payload of broadband packets, and (iii) provide CDS 201A and the other data traffic 204 to network interface 404. After receiving CDS 201A and the other data traffic 204, network interface 404 may transmit CDS 201A to SC-RAE 700 and the other data traffic 204 to its destination via a network that interfaces to network interface 404.

As another example, network device 138 may receive the combined data traffic 206 and then separate the combined data traffic 206 to recover CDS 200A, CDS 201A, and/or the other data traffic 204. Thereafter, network device 138 may provide CDS 200A to signal conditioner 108, provide CDS 201A to SC-RAE 700, and provide the other data traffic 204 to another network (not shown) that interfaces to network entity 138.

After receiving CDS 200A at signal conditioner 108, signal conditioner 108 may convert CDS 200A into ABS-3. As an example, the DAC 418 or the processor 412 may perform the conversion. ABS-3 may be provided to modulator 410. Modulator 410 may modulate a carrier with ABS-3 so as to generate an RF signal (e.g., RF signal 208) carrying ABS-3.

Modulator 410 may transmit RF signal 208 to communication connection interface 402. Communication connection interface 402 may then transmit RF signal 208 to RAE 104 via communication connection 114.

Next, at block 510, the RAE (e.g., RAE 104) receives the second RF signal (e.g., RF signal 208) and provides the second RF signal to an antenna of the RAE. RAE 104 may receive RF signal 208 from signal conditioner 108 via communication connection 114. RAE 104 may provide RF signal 208 directly to antenna feed 127 for transmission of RF signal 208 away from antenna 128. Alternatively, RAE 104 may first condition RF signal 208 (e.g., by amplifying RF signal 208) prior to providing RF signal 208 to antenna feed 127. Antenna feed 127 provides means for transporting RF signal 208 to antenna 128 and antenna 128 provides means for transmitting RF signal 208 away from RAE 104.

Alternatively, RAE 104 may receive ABS-3 and modulate a carrier with ABS-3 so as to generate RF signal 208. The RF carrier modulated by RAE 104 to produce RF signal 208 may be substantially identical to the carrier modulated at BTS 102 to form RF signal 200. After producing RF signal 208, RAE 104 may provide RF signal 208 to antenna feed 127 for transmission of RF signal 208 away from antenna 128.

RF signal 208 is substantially identical or identical to RF signal 200, such that RAE 104 may extend the cell or a cell sector of BTS 102 by transmission of RF signal 200. Similarly, RF signal 209 is substantially identical or identical to RF signal 201, such that SC-RAE 700 may extend the cell or a cell sector of BTS 102 by transmission of RF signal 209.

b. Data Communications—DAS to BTS

Figure 6:
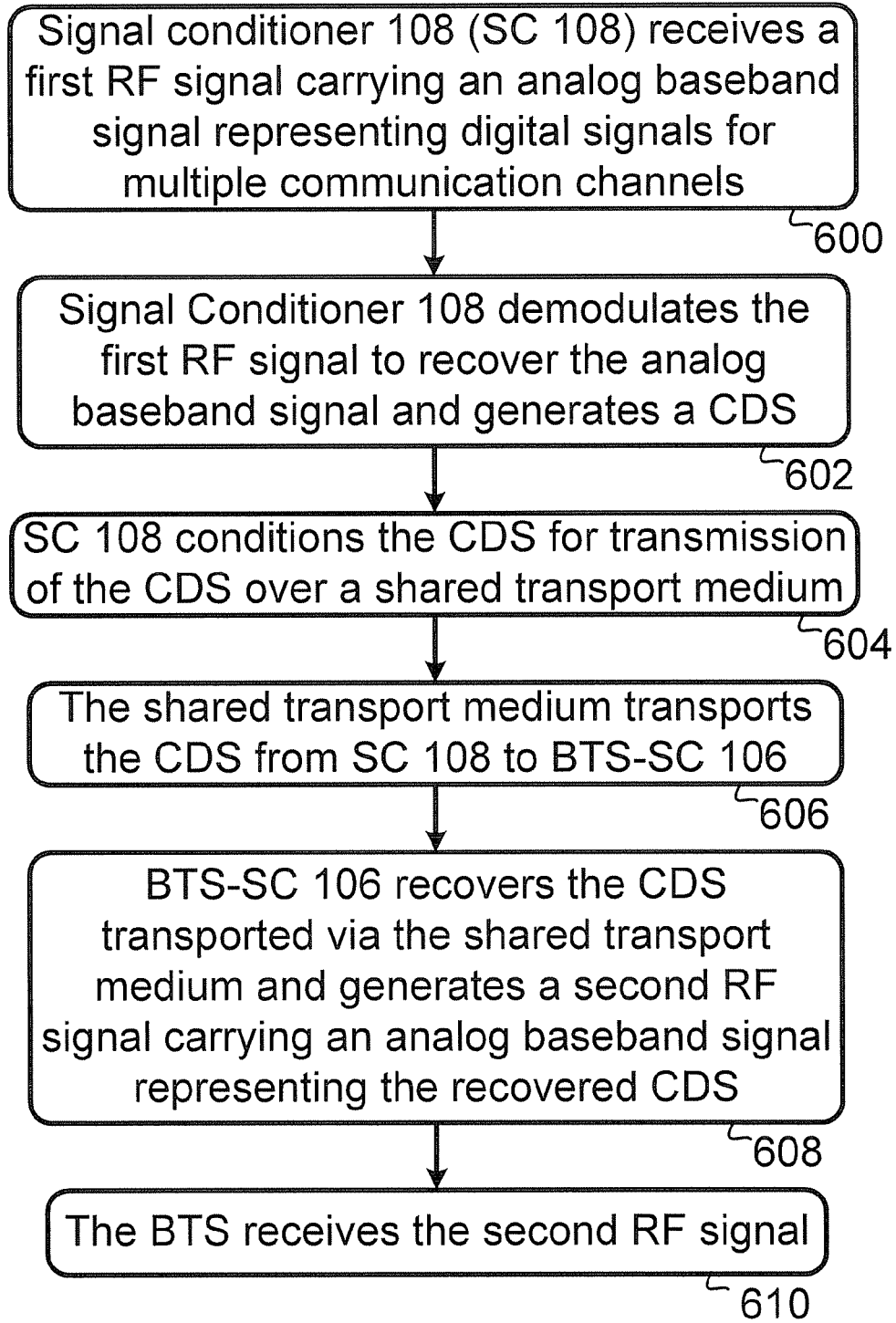
FIG. 6 is a flow chart depicting a set of functions that can be carried out in accordance with an exemplary embodiment for use in communicating data from a remote antenna entity to a base transceiver station.

FIG. 6 is a flow chart provided to illustrate another set of functions that may be carried out in accordance with an exemplary embodiment of the present invention. The functions shown in FIG. 6 are described below as functions for performing communications in a reverse-link direction from RAE 104 to BTS 102.

As shown in FIG. 6, at block 600, signal conditioner 108 receives a first RF signal (e.g., RF signal 210) carrying an analog baseband signal (e.g., ABS-5) representing digital signals for multiple communication channels. The digital signals for multiple communication channels may comprise all of the reverse-link digital signals received at RAE 104. The digital signals for multiple communication channels may be destined for BTS 102. The digital signals may be carried by RF signal 210 over air interface 124 from one or more WCDs. Antenna 128 may receive RF signal 210 and then provide RF signal 210 to RAE 104. RAE 104 may provide RF signal 210 to signal conditioner 108 via communication connection 114.

RF signal 210 may include multiple communication channels and control channels. The multiple communication channels and control channels may be reverse-link channels in accordance with any air interface protocol. For example, the multiple communication channels and control channels may include reverse-link channels in accordance with the CDMA, TDMA, OFDMA air interface protocol or another air interface protocol. Other examples of the multiple communication channels and control channels are also possible.

Signal conditioner 108 may receive RF signal 210 at communication connection interface 402. In response to receiving RF signal 210, communication connection interface 402 may provide RF signal 210 to demodulator 408 via connection mechanism 420.

Next, at block 602, signal conditioner 108 demodulates the first RF signal (e.g., RF signal 210) to recover the analog baseband signal (e.g., ABS-5) and generates a CDS (e.g., CDS 210A). Demodulation of RF signal 210 may be carried out by demodulator 408. Demodulator 408 may provide the recovered ABS-5 to processor 412 and/or ADC 416 for subsequent generation of CDS 210A according to any of the methods described herein, such as by measuring the power level of ABS-5 and encoding the CDS based on the measured power level and an amplitude of ABS-5.

Next, at block 604, signal conditioner 108 conditions the CDS (e.g., CDS 210A) for transmission of the CDS over transport medium 110. Conditioning CDS 210A may include conditioning CDS 210A for transmission over any of a variety of transport media (e.g., a wireless transport medium or a wireline transport medium such as electrical power line 720 or HFC network 724).

In one respect, modulator 410 may carry out at least a portion of the conditioning of CDS 210A. For example, modulator 410 may modulate a carrier with CDS 210A so as to generate an RF signal carrying CDS 210A. Modulator 410 may provide the RF signal carrying CDS 210A to transport medium interface 406 for transmission over shared transport medium 110 or to processor 412 for additional processing of CDS 210A.

In another respect, processor 412 may receive CDS 210A from modulator 410 or from demodulator 408 and thereafter execute program instructions to carry out at least a portion of the conditioning of CDS 210A. Processor 412 may condition CDS 210A in various ways. For example, processor 412 may execute program instructions that cause CDS 210A to be combined with CDS 211A and/or with the other data traffic 214 so as to generate the combined data traffic 216. As another example, processor 412 may execute program instructions to condition the CDS 210A by interleaving or multiplexing CDS 210A with CDS 211A and/or the other data traffic 214. As yet another example, processor 412 may execute program instructions to condition CDS 210A by packetizing CDS 210A as payload of a set of broadband packets. The set of broadband packets may be Ethernet packets as specified by IEEE 802.3 standards, CableLabs DOCSIS, PLC. Other examples of processor 412 executing program instructions to condition CDS 210A are also possible.

After conditioning CDS 210A, CDS 210A may be provided to transport medium interface 406 for subsequent transmission of CDS 210A over shared transport medium 110. If signal conditioner 108 combines CDS 210A with CDS 211A and/or the other data traffic 214 to form the combined data traffic 216, then signal conditioner 108 may provide CDS 210A to shared transport medium 110 by providing the combined data traffic 216 to shared transport medium 110.

In an alternative embodiment, a network entity, such as network server 138, may combine CDS 210A, CDS 211A, and the other data 214 to form the combined data traffic 216.

Next, at block 606, the shared transport medium 110 transports the CDS (e.g., CDS 210A) from signal conditioner 108 to BTS-SC 106. In one respect, transmission of CDS 210A over shared transport medium 110 may be carried out via a single transport medium, such as a broadband wireline transport medium or a broadband wireless transport medium. In another respect, transmission of CDS 210A over shared transport medium 110 may be carried out via transport media such as a broadband wireline transport medium and a broadband wireless transport medium. In this regard, CDS 210A may be transmitted over both the broadband wireline transport medium and the broadband wireless transport medium substantially simultaneously. In yet another respect, transmission of CDS 210A may be carried out by transmission of combined data traffic 216 over the shared transport medium 110.

After CDS 210A and/or combined data traffic 216 are transmitted via shared transport medium 110, BTS-SC 106 may receive CDS 210A separately or within the combined data traffic 216 that includes CDS 210A, CDS 211A, and/or the other data traffic 214. BTS-SC 106 may receive CDS 210A or combined data traffic 216 at transport medium interface 306.

Next, at block 608, BTS-SC 106 recovers the CDS (e.g., CDS 210A) transported via shared transport medium 110 and generates a second RF signal (e.g., RF signal 218) carrying an analog baseband signal representing the recovered CDS. BTS-SC 106 may recover CDS 210A using a method appropriate for how CDS 210A is transported across transport medium 110. For example, if CDS 210A is transported across transport medium 110 as a modulated signal, CDS 210A may be recovered by demodulating the modulated signal at demodulator 308.

In accordance with the example in which CDS 210A is transported across transport medium 110 as combined data traffic 216, various methods may be used to recover CDS 210A. For example, BTS-SC 106 may receive the combined data traffic 216 at transport medium interface 306 and responsively provide the combined data traffic 216 to processor 312. Processor 312 may execute program instructions to (i) separate the combined data traffic 216 to recover CDS 210A, CDS 211A, and/or the other data traffic 214, (ii) condition the recovered CDS 210A, (e.g., by providing CDS 210A to demodulator 308 if CDS 210A is modulated), or perform other conditioning methods if CDS 210A is packetized as payload of broadband packets, and (iii) provide the other data traffic 214 to network interface 304. After receiving the other data traffic 214, network interface 304 may transmit the other data traffic 214 to its destination via a network interfacing to network interface 304.

Additionally, processor 312 may execute program instructions that cause CDS 210A to be converted to ABS-7. Processor 312 or DAC 318 may perform this conversion. Modulator 310 may modulate an RF carrier with ABS-7 so as to generate a second RF signal (e.g., RF signal 219) carrying ABS-7. Modulator 310 may provide RF signal 219 to antenna feed interface 302 for subsequent transmission of RF signal 219 to BTS 102.

As another example, the network device 136 may receive the combined data traffic 216 and then separate the combined data traffic 216 to recover CDS 210A, CDS 211A, and/or the other data traffic 214. Thereafter, the network device 136 may provide CDS 210A and CDS 211A to BTS-SC 106, and provide the other data traffic 214 to a network that interfaces to the network device 136.

After receiving CDS 210A at BTS-SC 106, CDS 210A may be provided to processor 312 and/or the DAC 318. Processor 312 and/or the DAC 318 may convert CDS 210A to ABS-7. Modulator 310 may modulate a carrier with ABS-7 so as to generate an RF signal (e.g., RF signal 219) carrying ABS-7. As an example, modulator 310 may perform modulation in accordance with the CDMA protocol. In this regard, RF signal 219 may be arranged as a CDMA RF signal. Other examples of the modulation performed to generate RF signal 219, such as TDMA modulation or OFDMA modulation are also possible.

Modulator 310 may transmit RF signal 219 to antenna feed interface 302, which then transmits RF signal 219 to BTS 102 via antenna feed 112. Modulator 310 may also transmit other RF signals (e.g., RF signal 219) to antenna feed interface 302, which then transmits the other RF signals to BTS 102 via antenna feed 112.

Next, at block 610, the BTS 102 receives the second RF signal (e.g., RF signal 219). BTS 102 may receive RF signal 219, as well as the other RF signals (e.g., RF signal 218), from BTS-SC 106 via antenna feed 112. After receiving the RF signal 219, BTS 102 may communicate all or a portion of RF signal 219 to respective destinations of the digital signals represented by ABS-7. For instance, digital signals of reverse-link control channels may be communicated within the BTS 102 so that the BTS can process the control channel digital signals. As another example, digital signals of reverse-link communication channels may be communicated to another telephone or computer connected to an IP network or a PSTN, or may be communicated via the BTS on forward-link communication channels to a WCD that is engaging in a call with a WCD that generated the digital signals. Other examples of communicating all or a portion of the RF signal 219, as well as examples of BTS 102 communicating all or a portion of other RF signals received from BTS-SC 106, are also possible.

c. Data Communications—Using a Signal Conditioning Remote Antenna Entity

As indicated above, SC-RAE 700 may be used to carry out forward-link and reverse-link communications. SC-RAE 700 may connect directly to shared transport medium 110, which may include electrical power line 720, HFC network 724, or another broadband wireline network. Alternatively, SC-RAE 700 may connect to another device that provides interface to shared transport medium 110, such as signal conditioner 108. SC-RAE 700 may connect to the other device via electrical power line 720 and/or HFC network 724.

Figure 8:
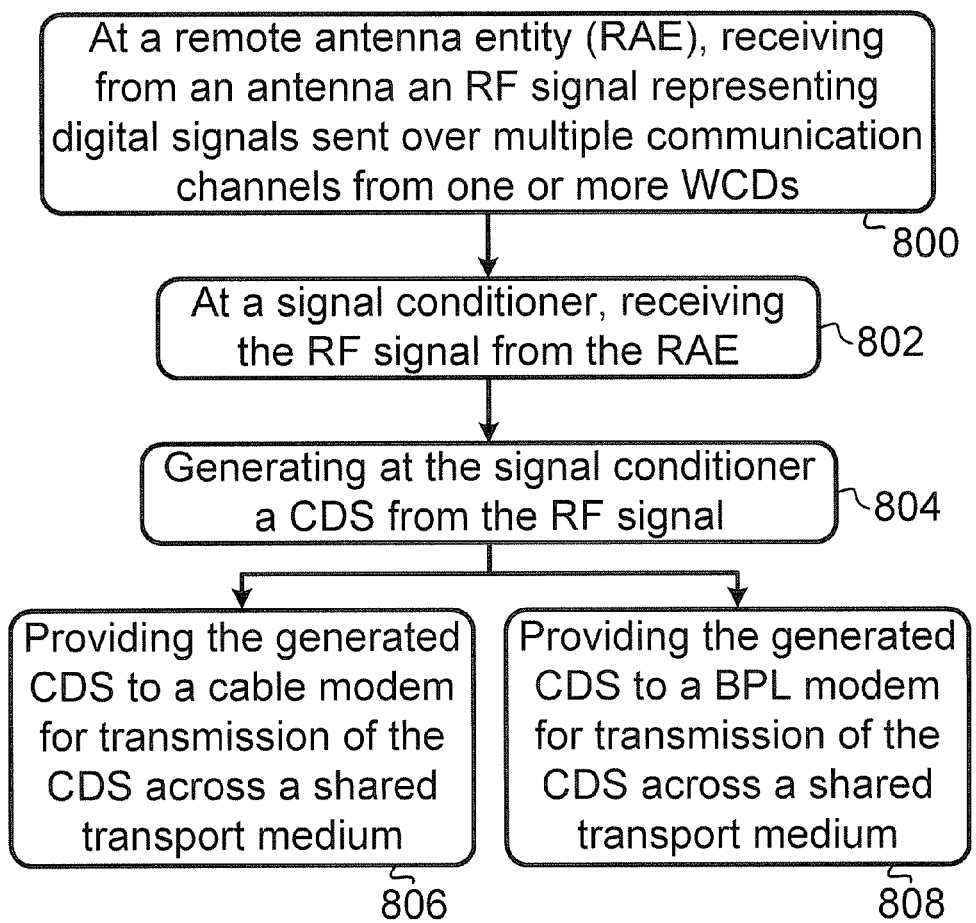
FIGS. 8 and 9 are flow charts depicting sets of functions that may be carried out in accordance with exemplary embodiments comprising a signal conditioning remote antenna entity (SC-RAE).

FIG. 8 is a flow chart provided to illustrate a set of functions that may be carried out in accordance with an exemplary embodiment in which SC-RAE 700 receives communications having a BTS as a destination. Two or more of the functions shown in FIG. 8 may occur substantially simultaneously. One or more of the functions shown in FIG. 8 may be omitted.

As shown in FIG. 8, block 800 includes at an RAE (e.g., RAE 704 of SC-RAE 700), receiving from an antenna (e.g., antenna 702) an RF signal (e.g., RF signal 211) representing digital signals sent over multiple communication channels from one or more WCDs. RF signal 211 may carry the digital signals as ABS-6. The digital signals may have BTS 102 as a destination. The digital signals may comprise all of the digital signals for a given cell or cell sector of BTS 102 in the reverse-link direction. The multiple communication channels may be reverse-link channels in accordance with the CDMA air interface protocol or another air interface protocol.

Next, block 802 includes at a signal conditioner (e.g., signal conditioner 706 of SC-RAE 700), receiving the RF signal (e.g., RF signal 211) from the RAE (e.g., RAE 704). Signal conditioner 706 may receive RF signal 211 via connection mechanism 718 or by another connection mechanism, such as a dedicated connection mechanism that connects conditioner 706 to RAE 704.

Next, block 804 includes generating at the signal conditioner (e.g., signal conditioner 706) a CDS (e.g., CDS 211A) from the RF signal (e.g., RF signal 211). Signal conditioner 706 may generate CDS 211A using any of a variety of methods. Generating CDS 211A may include demodulating RF signal 211 to recover ABS-6, measuring the power level of ABS-6, and encoding the CDS based on the measured power level and an amplitude of ABS-6. CDS 211A may be generated from an RF signal covering a frequency range in accordance with a CDMA air interface frequency range (e.g., a frequency range within 1850-1910 MHz) or a frequency range of another air interface protocol. Other examples of signal conditioner generating a CDS are also possible.

Next, block 806 includes providing the generated CDS (e.g., CDS 211A) to a cable modem (e.g., cable modem 710) for transmission of the CDS across a shared transport medium 110 (e.g., a transport medium comprising HFC network 724). Cable modem 710 may packetize CDS 211A as payload into a set of broadband packets, then modulate the set of broadband packets onto an RF carrier signal or an RF sub-carrier signal, and thereafter, provide the RF carrier or sub-carrier modulated with the set of broadband packets with CDS 211A as payload to cable modem 710 and, in turn, to HFC network 724.

Alternatively, signal conditioner 706 may packetize CDS 211A as payload into the set of broadband packets, modulate the set of broadband packets onto an RF carrier or sub-carrier and then provide this modulated RF carrier or sub-carrier to cable modem 710. Further, signal conditioner 706 or cable modem 710 may modulate the set of broadband packets having CDS 211A as payload onto multiple RF carriers or sub-carriers, for subsequent transmission from cable modem 710.

The RF carrier or sub-carriers may be received at signal conditioner 106 and/or the BTS 102. The signal conditioner 106 and/or the BTS 102 may recover the CDS transmitted across the shared transport medium and convert the recovered CDS to ABS-8. In the instance in which the signal conditioner 106 converts the CDS to ABS-8, the signal conditioner 106 may provide ABS-8 to the BTS 102.

Next, block 808 includes providing the generated CDS (e.g., CDS 211A) to a BPL modem (e.g., BPL modem 708) for transmission of the CDS across a shared transport medium 110 (e.g., a transport medium comprising power line 720). BPL modem 708 may receive an electrical current signal from electrical power line 720. BPL modem 708 may packetized CDS 211A as payload into a set of broadband packets, then modulate the set of broadband packets onto the received electrical current signal so as to convert the received electrical current signal into a modulated electrical current signal carrying the set of broadband packets. The set of broadband packets may carry other data packets simultaneously with the packets carrying CDS 211A. BPL modem 708 may then provide the modulated electrical current signal to electrical power line 720 for transmission of the set of broadband packets over power line 720.

A device (e.g., BPL modem 750, BTS-SC 106, or signal conditioner 108) at a far-end of power line 720 may demodulate the modulated electrical current signal so as to recover the set of broadband packets including packets with a payload carrying CDS 211A. CDS 211A may be recovered from the set of broadband packets and converted to ABS-8. The BPL modem 708, the signal conditioner 106 and/or the BTS 102 may convert the CDS to ABS-8. In the instance in which the BPL modem 708 or the signal conditioner 106 convert the CDS, the BPL modem or the signal conditioner 106 may subsequently provide ABS-8 to the BTS 102. In this way, BTS 102 is provided with an analog baseband signal identical or substantially identical to the analog baseband signal received at RAE 704.

The functions carried out in blocks 806 and 808 may be carried out substantially simultaneously so as to allow SC-RAE 700 to operate in mode 3 as described herein. Alternatively, only the functions of either block 806 or block 808 may be carried out at any one time so as to allow SC-RAE 700 to operate in either mode 1 or mode 2 as described herein.

Figure 9:
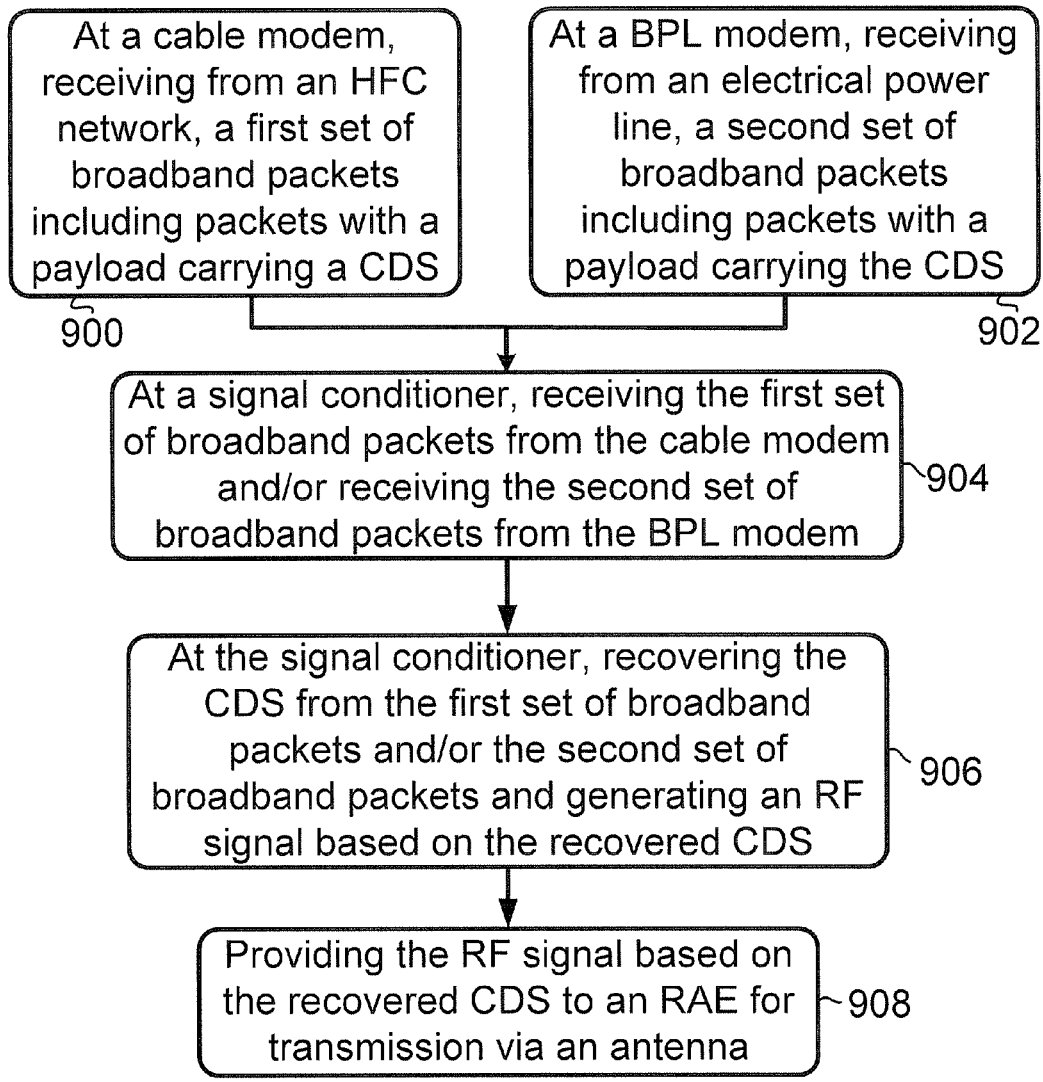

Next, FIG. 9 is a flow chart provided to illustrate a set of functions that may be carried out in accordance with an exemplary embodiment in which SC-RAE 700 receives communications being transmitted in a forward-link direction from BTS 102. Two or more of the functions shown in FIG. 9 may occur substantially simultaneously. Further, one or more of the functions shown in FIG. 9 may be omitted in carrying out the invention.

Block 900 includes at a cable modem (e.g., cable modem 710), receiving from an HFC network (e.g., HFC network 724) a first set of broadband packets including packets with a payload carrying a CDS (e.g., CDS 201A). CDS 201A may be generated from ABS-2 at BTS-SC 106 or BTS 102.

Cable modem 710 may receive the first set of broadband packets including packets with the payload carrying CDS 201A by receiving an RF signal (e.g., RF signal 211) carrying the broadband packets. RF signal 211 may cover a frequency range of signals including frequency signals transmittable over transport medium 110 (e.g., the HFC network 724). After receiving RF signal 211, cable modem 710 may demodulate RF signal 211 so as to recover the first set of broadband packets. Thereafter, cable modem 710 may transmit the first set of broadband packets including the packets with the payload carrying CDS 201A to signal conditioner 706 or another element of SC-RAE 700.

Block 902 includes at a BPL modem (e.g., BPL modem 708), receiving from an electrical power line (e.g., power line 720) a second set of broadband packets including packets with a payload carrying the CDS (e.g., CDS 201A). CDS 201A may be modulated onto an electrical signal and transported to BPL modem 708 over electrical power line 720 via the electrical signal. The modulated electrical signal may be generated by any of a variety of devices such as BTS-SC 106, signal conditioner 108, or BPL modem 750.

BPL modem 708 may receive the second set of broadband packets by receiving from electrical power line 720 the modulated electrical signal carrying an RF signal (e.g., RF signal 211). In this way, after receiving the electrical signal, BPL modem 708 may demodulate the electrical signal to recover RF signal 201 and then demodulate RF signal 201 to recover the second set of broadband packets including the packets with the payload carrying CDS 201A. Thereafter, BPL modem 708 may transmit the second set of broadband packets to signal conditioner 706 or another element of SC-RAE 700.

The functions carried out in blocks 900 and 902 may be carried out substantially simultaneously so as to allow SC-RAE 700 to operate in mode 3 as described herein. Alternatively, only the functions of either block 900 or block 902 may be carried out at any one time so as to allow SC-RAE 700 to operate in either mode 1 or mode 2 as described herein.

Next, block 904 includes at a signal conditioner (e.g., signal conditioner 706), receiving the first set of broadband packets from the cable modem (e.g., cable modem 710) and/or receiving the second set of broadband packets from BPL modem 708. Signal conditioner 706 may receive the first set of broadband packets and/or the second set of broadband packets by way of connection mechanism 718 or by another connection mechanism, such as a dedicated connection mechanism connecting signal conditioner 706 to cable modem 710 and/or a dedicated connection mechanism connecting BPL modem 708.

Next, block 906 includes at the signal conditioner (e.g., signal conditioner 706), recovering the CDS (e.g., CDS 201A) from the first set of broadband packets and/or from the second set of broadband packets and generating an RF signal (e.g., RF signal 209) based on the recovered CDS. In the case in which SC-RAE 700 operates in mode 1, signal conditioner 706 may recover CDS 201A from the second set of broadband packets transmitted to signal conditioner 706 from BPL modem 708. In the case in which SC-RAE 700 operates in mode 2, signal conditioner 706 may recover CDS 201A from the first set of broadband packets transmitted to BTS-SC 106 from cable modem 710. In the case in which SC-RAE 700 operates in mode 3, signal conditioner 706 may recover CDS 201A from the first set of broadband packets and/or from the second set of broadband packets.

The recovered CDS 201A is converted to ABS-4 perhaps by the processor 712 or the signal conditioner 706. RF signal 209 may be generated by modulating a carrier signal with ABS-4 such that RF signal 209 carries ABS-4. The carrier may cover a subset of a frequency range of a CDMA air interface protocol or another air interface protocol.

Next, block 908 includes providing the RF signal based on the recovered CDS (e.g., RF signal 209) to an RAE (e.g., RAE 704) for transmission via an antenna. Signal conditioner 706 may transmit the RF signal 209 to RAE 704 for transmission, in turn, via the antenna 702. One or more wireless communication devices within range of RAE 704 and antenna 702 may receive RF signal 209. The one or more wireless communication devices can recover ABS-4 from RF signal 209 and recover the digital signals represented by ABS-4, which are identical or substantially identical to the digital signals represented by ABS-3. In this way, the one or more wireless communication device may receive the digital signals for multiple forward-link communication channels that are represented by ABS-3.

4. CONCLUSION

Exemplary embodiments of the present invention have been described above. Those skilled in the art will understand, however, that changes and modifications may be made to the embodiments described without departing from the true scope and spirit of the present invention, which is defined by the claims.

Finally, the word "exemplary" is used herein to mean "serving as an example, instance, or illustration." Any embodiment described herein as "exemplary" is not necessarily to be construed as preferred or advantageous over other embodiments.

We claim:

1. A system comprising:
   an antenna;
   a cable modem connectable to a coaxial cable of a Hybrid Fiber Coaxial (HFC) network;
   a remote antenna entity connected to the antenna,
   wherein the remote antenna entity receives from the antenna a first radio frequency (RF) signal carrying a first analog baseband signal representing digital signals having a destination of a base transceiver station (BTS),
   wherein the digital signals are transmitted to the antenna via multiple reverse-link communication channels from one or more wireless communication devices; and
   a first signal conditioner connected to the remote antenna entity and to the cable modem,
   wherein the first signal conditioner (i) receives the first RF signal from the remote antenna entity, (ii) demodulates the first RF signal to recover the first analog baseband signal, (iii) makes power level measurements of the recovered first analog baseband signal, (iv) generates a combined digital signal comprising data bits representing one of the power level measurements, (v) generates a set of broadband packets with payload carrying the combined digital signal, and (vi) provides the set of broadband packets with payload carrying the combined digital signal to the cable modem for transmission over the HFC network for receipt at a second signal conditioner that interfaces to the BTS.

2. The system of claim 1, further comprising:
   a housing,
   wherein the remote antenna entity and the first signal conditioner are located within the housing.

3. The system of claim 2, wherein the antenna is located within the housing.

4. The system of claim 3, wherein at least a portion of the antenna is located outside of the housing.

5. The system of claim 2, wherein the cable modem includes an F-connector.

6. The system of claim 1,
   wherein the digital signals are converted to the first analog baseband signal at a clock rate interval for an air interface protocol defining the multiple reverse-link communication channels, and
   wherein the power level measurements of the recovered first analog baseband signal are made at the clock rate interval.

7. The system of claim 6, wherein the clock rate interval is between 800 nano seconds and 850 nano seconds.

8. The system of claim 1, wherein the digital signals comprise all of the digital signals for a given cell or cell sector of the BTS for reverse-link communications during the interval when the one power level measurement is made.

9. The system of claim 1, further comprising:
   a broadband over power line (BPL) modem that receives electrical current via an electrical power line connected to the BPL modem;
   wherein the BPL modem (i) receives from the first signal conditioner, the set of broadband packets with payload carrying the combined digital signal, (ii) modulates the set of broadband packets with payload carrying the combined digital signal onto the received electrical current so as to convert the received electrical current into a modulated electrical current carrying the set of broadband packets with payload carrying the combined digital signal, and (iii) provides the modulated electrical current to the power line for transmission of the set of broadband packets over the power line, and wherein the set of broadband packets with payload carrying the combined digital signal is recovered from the modulated electrical current at another BPL modem located at a far-end of the power line, and wherein the combined digital signal is recovered from the set of broadband packets and thereafter provided to the BTS.

10. The system of claim 9, wherein the first signal conditioner provides the set of broadband packets to the cable modem and the BPL modem at substantially the same time.

11. The system of claim 1, further comprising:
a broadband over power line (BPL) modem connected to an electrical power line;
a processor; and
data storage containing program instructions executable by the processor,
wherein the program instructions include instructions that cause the processor to: (i) determine that the system cannot communicate via the HFC network, and responsively cause the system to operate in a first mode, and (ii) determine that the system can communicate via the HFC network, and responsively cause the system to operate in a second mode,
wherein when the system operates in the first mode, the BPL modem transmits the set of broadband packets with payload carrying the combined digital signal to the electrical power line, and
wherein when the system operates in the second mode, the cable modem transmits the set of broadband packets with payload carrying the combined digital signal to the HFC network.

12. The system of claim 1, further comprising:
the second signal conditioner,
wherein the second signal conditioner receives from the BTS a second RF signal carrying a second analog baseband signal representing digital signals destined to be sent to the one or more wireless communication devices via multiple forward-link communication channels,
wherein the second signal conditioner (i) demodulates the second RF signal to recover the second analog baseband signal, (ii) makes power level measurements of the recovered second analog baseband signal, (iii) generates a second combined digital signal comprising data bits representing one of the power level measurements of the recovered second analog baseband signal, and (iv) generates a second set of broadband packets with payload carrying the second combined digital signal,
wherein the cable modem receives from the second signal conditioner via the HFC network the second set of broadband packets with payload carrying the second combined digital signal,
wherein the first signal conditioner (i) receives from the cable modem the second set of broadband packets with payload carrying the second combined digital signal, (ii) recovers the second combined digital signal from the second set of broadband packets, (iii) converts the second combined digital signal to a third analog baseband signal substantially similar to the second analog baseband signal, and (iv) modulates an RF carrier with the third analog baseband signal so as to generate a third RF signal carrying the third analog baseband signal,
wherein the remote antenna entity receives from the first signal conditioner the third RF signal and transmits the third RF signal to the antenna for transmission of the third RF signal to the one or more wireless communication devices.

13. The system of claim 1, wherein the system is located within an indoor premises.

14. A method comprising:
at a remote antenna entity, receiving from an antenna connected to the remote antenna entity a first radio frequency (RF) signal carrying a first analog baseband signal,
wherein the first analog baseband signal represents digital signals having a destination of a base transceiver station (BTS), wherein the first RF signal comprises multiple RF signals transmitted to the antenna via multiple reverse-link communication channels from one or more wireless communication devices; and
at a first signal conditioner connected to the remote antenna entity and to a cable modem connectable to a Hybrid Fiber Coaxial (HFC) network, (i) receiving the first RF signal from the remote antenna entity, (ii) demodulating the first RF signal to recover the first analog baseband signal, (iii) making power level measurements of the recovered first analog baseband signal, (iv) generating a first combined digital signal comprising data bits representing one of the power level measurements of the recovered first analog baseband signal, (v) producing a first set of broadband packets with payload carrying the first combined digital signal, and (vi) providing the first set of broadband packets with payload carrying the first combined digital signal to the cable modem for transmission of the first set of broadband packets with payload carrying the first combined digital signal via the HFC network and, in turn, to the BTS.

15. The method of claim 14,
wherein the digital signals are converted to the first analog baseband signal at a clock rate interval for an air interface protocol defining the multiple reverse-link communication channels, and
wherein the power level measurements of the recovered first analog baseband signal are made at the clock rate interval.

16. The method of claim 14, further comprising:
at a second signal conditioner that interfaces to the BTS (i) receiving from the BTS a second RF signal carrying a second analog baseband signal, (ii) demodulating the second RF signal to recover the second analog baseband signal, (iii) making power level measurements of the recovered second analog baseband signal, (iv) generating a second combined digital signal comprising data bits representing one of the power level measurements of the recovered second analog baseband signal, and (iv) generating a second set of broadband packets with payload carrying the second combined digital signal,
wherein the second analog baseband signal represents digital signals destined to be sent to the one or more wireless communication devices over multiple forward-link communication channels,
at the cable modem, receiving from the HFC network the second set of broadband packets,
at the first signal conditioner, receiving from the cable modem the second set of broadband packets, recovering the second combined digital signal from the second set of broadband packets, converting the second combined digital signal to a third analog baseband signal substantially similar to the second analog baseband signal, and modulating an RF carrier with the third analog baseband signal so as to generate a third RF signal carrying the third analog baseband signal; and providing the third RF signal from the first signal conditioner to the remote antenna entity for transmission of the third RF signal away from the remote antenna entity via the antenna.

17. The method of claim 16,
wherein the cable modem receives from the HFC network a plurality of sub-carriers including a given sub-carrier,
wherein the second set of broadband packets is carried to the cable modem via the given sub-carrier,
wherein the cable modem includes filter circuitry and a demodulator,
wherein the cable modem passes the plurality of sub-carriers through the filter circuitry for recovery of the given sub-carrier, and
wherein the given sub-carrier is provided to the demodulator for recovering from the given sub-carrier the second set of broadband packets with payload carrying the second combined digital signal.

18. The method of claim 14,
wherein the first signal conditioner is connected to a broadband over power line (BPL) modem, and
wherein the BPL modem is connectable to a power line carrying an electrical current,
the method further comprising:
receiving at the BPL modem (i) the electrical current from the power line, and (ii) from the first signal conditioner, the first set of broadband packets with payload carrying the first combined digital signal,
at the BPL modem, modulating the first set of broadband packets with payload carrying the first combined digital signal onto the received electrical current so as to convert the received electrical current into a modulated electrical current carrying the first set of broadband packets with payload carrying the first combined digital signal, and
providing the modulated electrical current to the power line for transmission of the modulated electrical current over the power line,
wherein the first set of broadband packets with payload carrying the first combined digital signal can be recovered from the modulated electrical current by another BPL modem located at a far-end of the power line and thereafter transmitted to the BTS.

19. The method of claim 14, wherein providing the first set of broadband packets with payload carrying the first combined digital signal to the cable modem includes providing to an RF carrier of the HFC network a second RF signal modulated with the first set of broadband packets with payload carrying the first combined digital signal.

20. The method of claim 14, wherein the multiple communication channels include communication channels selected from the group consisting of: (i) voice channels, (ii) data channels, and (iii) control channels.

21. The method of claim 14, further comprising:
at the cable modem, modulating a second RF carrier with the first set of broadband packets with payload carrying the first combined digital signal so as to generate a second RF signal that carries the first set of broadband packets,
wherein transmission of the first set of broadband packets with payload carrying the first combined digital signal via the HFC network includes the cable modem transmitting the second RF signal via the HFC network.

22. The method of claim 14, wherein the remote antenna entity and the signal conditioner are located within a housing.

23. A method comprising:
(i) demodulating a first radio frequency (RF) signal carrying a first analog baseband signal so as to recover the analog baseband signal,
wherein the first analog baseband signal represents digital signals destined for transmission to one or more wireless communication devices via multiple communication channels;
(ii) making power level measurements of the recovered first analog baseband signal at a clock rate interval for an air interface protocol defining the multiple communication channels;
(iii) generating a combined digital signal comprising data bits that represent one of the power level measurements of the recovered first analog baseband signal;
(iv) generating a set of broadband packets carrying the combined digital signal as a payload and transmitting the set of broadband packets to a transport medium including a Hybrid Fiber Coaxial (HFC) network,
(v) at a cable modem connectable to the HFC network and to a first signal conditioner connected to a remote antenna entity, receiving from the HFC network the set of broadband packets carrying the combined digital signal as a payload,
(vi) at the first signal conditioner, receiving from the cable modem the set of broadband packets carrying the combined digital signal as a payload, recovering the combined digital signal from the set of broadband packets, converting the recovered combined digital signal to a second analog baseband signal substantially similar to the first analog baseband signal, and modulating an RF carrier with the second analog baseband signal so as to generate a second RF signal carrying the second analog baseband signal;
(vii) providing the second RF signal carrying the second analog baseband signal to the remote antenna entity; and
(viii) transmitting the second RF signal carrying the second analog baseband signal away from the remote antenna entity and to the one or more wireless communication devices.

24. The method of claim 23,
wherein the digital signals are converted to the first analog baseband signal at the clock rate interval for the air interface protocol defining the multiple communication channels.

25. The method of claim 24, further comprising:
repeating the functions of (iii), (iv), (v), (vi), (vii), and (viii) for each of the other power level measurements of the recovered analog baseband signal.

26. The method of claim 24, wherein demodulating the first RF signal, making the power level measurements, generating the combined digital signal, and generating the set of broadband packets are carried out at a base transceiver station.

27. The method of claim 24, wherein demodulating the first RF signal, making the power level measurements, generating the combined digital signal, and generating the set of broadband packets are carried out at a second signal conditioner that interfaces to a remote base transceiver station.

* * * * *